US012566909B1

(12) United States Patent
Abarham et al.

(10) Patent No.: US 12,566,909 B1
(45) Date of Patent: Mar. 3, 2026

(54) PREDICTION OF STEADY STATE HEAT MAPS FOR CHIP THERMAL ANALYSIS

(71) Applicant: Ansys, Inc., Canonsburg, PA (US)

(72) Inventors: Mehdi Abarham, Belmont, CA (US);
Saeed Asgari, Westborough, MA (US);
Jimin Wen, Pleasanton, CA (US);
Norman Chang, Fremont, CA (US);
David Geb, Walnut Creek, CA (US);
Viralkumar Girishchandra Gandhi,
Nashua, NH (US); Hsiming Pan, San
Jose, CA (US); Akhilesh Kumar,
Milpitas, CA (US); Haiyang He,
Washington, PA (US)

(73) Assignee: Ansys, Inc., Canonsburg, PA (US)

( * ) Notice: Subject to any disclaimer, the term of this
patent is extended or adjusted under 35
U.S.C. 154(b) by 793 days.

(21) Appl. No.: 17/934,847

(22) Filed: Sep. 23, 2022

Related U.S. Application Data

(60) Provisional application No. 63/253,383, filed on Oct.
7, 2021.

(51) Int. Cl.
*G06F 30/3308* (2020.01)
*G06F 119/08* (2020.01)
(52) U.S. Cl.
CPC ...... *G06F 30/3308* (2020.01); *G06F 2119/08*
(2020.01)
(58) Field of Classification Search
CPC .... G06F 2119/08; G06F 30/20; G06F 30/398;
G06F 30/3308; G06T 2207/30148
See application file for complete search history.

(56) References Cited

U.S. PATENT DOCUMENTS

| | | | |
|---|---|---|---|
| 2019/0034578 A1* | 1/2019 | Chang | G06F 30/398 |
| 2020/0004918 A1* | 1/2020 | Sha | G03F 7/705 |
| 2020/0159978 A1* | 5/2020 | Pan | G06F 30/23 |

(Continued)

*Primary Examiner* — Brian W Wathen
(74) *Attorney, Agent, or Firm* — WOMBLE BOND
DICKINSON (US) LLP

(57) ABSTRACT

A method and apparatus of a device of predicting a heat map
for a die model is described. In an exemplary embodiment,
the device receives a die model for representing the die and
a boundary condition applicable to the die, the die model
including dimensions of the die. In addition, the device may
include scaling the dimensions of the die model and the
boundary condition, wherein the dimensions of the die
model are scaled to a target die size, the scaled dimensions
including a scaled die thickness. Furthermore, each trained
die model including a die surface of the target die size,
different trained die models having different die thickness,
the plurality of trained die models trained under a plurality
of boundary conditions, each trained die model having a
plurality of decay curves associated with the plurality of
boundary conditions. The method may additionally include
determining a relationship between the scaled boundary
condition and the plurality of boundary conditions. In addi-
tion, the method may include determining a decay curve for
the die model according to a combination of decay curves
associated with the plurality of boundary conditions for the
one or more trained die models using the relationship.
Furthermore, the method may include generating the die
heat map based on the decay curve determined for the die
model.

24 Claims, 30 Drawing Sheets

(56) References Cited

U.S. PATENT DOCUMENTS

| 2021/0118754 A1* | 4/2021 | Burch | H01L 22/14 |
| 2021/0158223 A1* | 5/2021 | Sezginer | G06N 3/09 |
| 2021/0287352 A1* | 9/2021 | Calderon | G06V 10/772 |

* cited by examiner

INTEGRATED CIRCUIT HEAT
MAP
100

HOT SPOTS
102

COOL SPOTS
104

DIE MODEL 400

DIE MODEL 500

SCALED DIE
MODEL 502

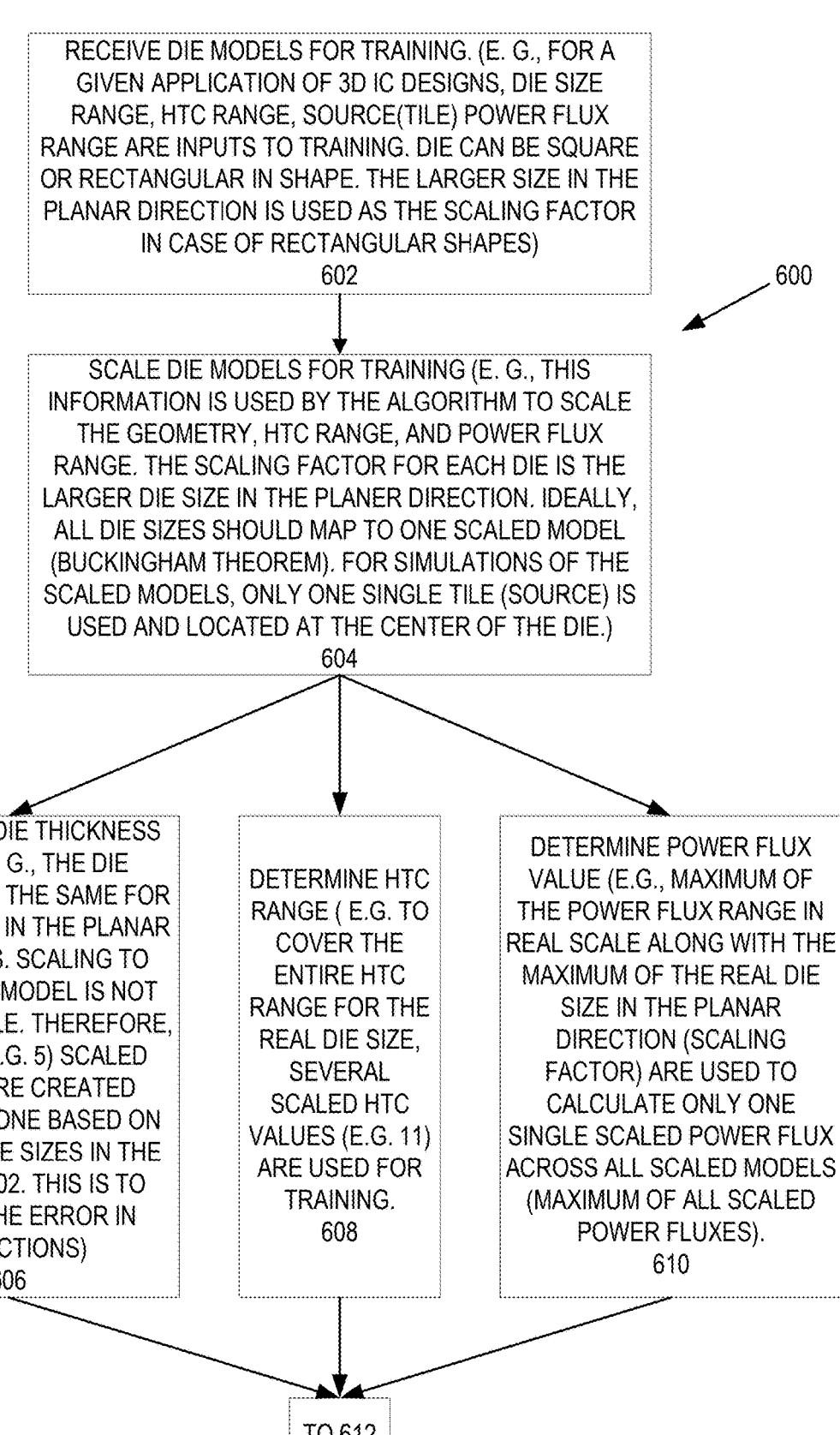

RECEIVE DIE MODELS FOR TRAINING. (E. G., FOR A GIVEN APPLICATION OF 3D IC DESIGNS, DIE SIZE RANGE, HTC RANGE, SOURCE(TILE) POWER FLUX RANGE ARE INPUTS TO TRAINING. DIE CAN BE SQUARE OR RECTANGULAR IN SHAPE. THE LARGER SIZE IN THE PLANAR DIRECTION IS USED AS THE SCALING FACTOR IN CASE OF RECTANGULAR SHAPES)
602

600

SCALE DIE MODELS FOR TRAINING (E. G., THIS INFORMATION IS USED BY THE ALGORITHM TO SCALE THE GEOMETRY, HTC RANGE, AND POWER FLUX RANGE. THE SCALING FACTOR FOR EACH DIE IS THE LARGER DIE SIZE IN THE PLANER DIRECTION. IDEALLY, ALL DIE SIZES SHOULD MAP TO ONE SCALED MODEL (BUCKINGHAM THEOREM). FOR SIMULATIONS OF THE SCALED MODELS, ONLY ONE SINGLE TILE (SOURCE) IS USED AND LOCATED AT THE CENTER OF THE DIE.)
604

DETERMINE DIE THICKNESS RANGE (E. G., THE DIE THICKNESS IS THE SAME FOR ALL DIE SIZES IN THE PLANAR DIRECTIONS. SCALING TO ONE SINGLE MODEL IS NOT THEN POSSIBLE. THEREFORE, SEVERAL (E.G. 5) SCALED MODELS ARE CREATED INSTEAD OF ONE BASED ON SELECTED DIE SIZES IN THE RANGE IN 202. THIS IS TO REDUCE THE ERROR IN PREDICTIONS)
606

DETERMINE HTC RANGE ( E.G. TO COVER THE ENTIRE HTC RANGE FOR THE REAL DIE SIZE, SEVERAL SCALED HTC VALUES (E.G. 11) ARE USED FOR TRAINING.
608

DETERMINE POWER FLUX VALUE (E.G., MAXIMUM OF THE POWER FLUX RANGE IN REAL SCALE ALONG WITH THE MAXIMUM OF THE REAL DIE SIZE IN THE PLANAR DIRECTION (SCALING FACTOR) ARE USED TO CALCULATE ONLY ONE SINGLE SCALED POWER FLUX ACROSS ALL SCALED MODELS (MAXIMUM OF ALL SCALED POWER FLUXES).
610

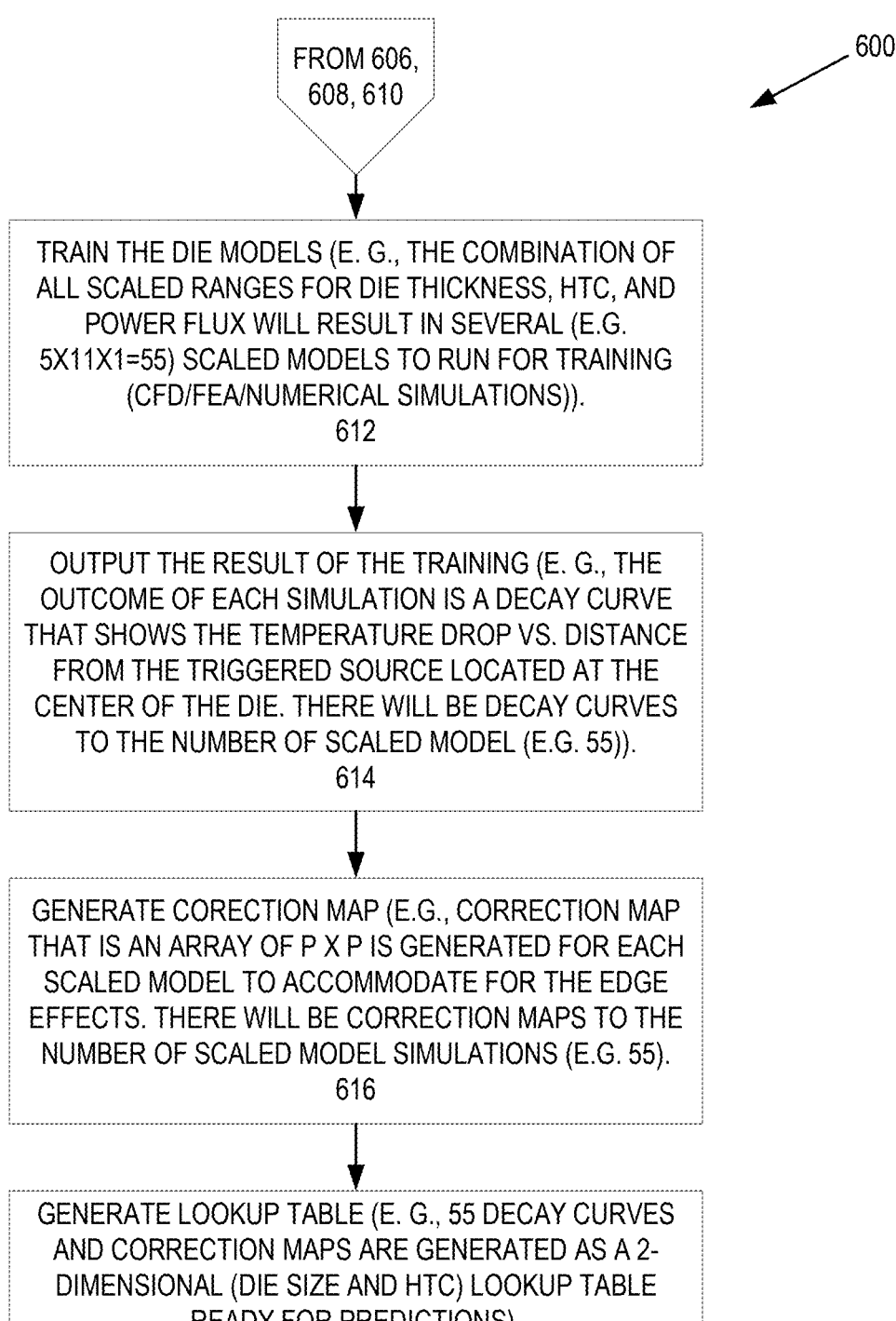

FROM 606, 608, 610

600

TRAIN THE DIE MODELS (E. G., THE COMBINATION OF ALL SCALED RANGES FOR DIE THICKNESS, HTC, AND POWER FLUX WILL RESULT IN SEVERAL (E.G. 5X11X1=55) SCALED MODELS TO RUN FOR TRAINING (CFD/FEA/NUMERICAL SIMULATIONS)).
612

OUTPUT THE RESULT OF THE TRAINING (E. G., THE OUTCOME OF EACH SIMULATION IS A DECAY CURVE THAT SHOWS THE TEMPERATURE DROP VS. DISTANCE FROM THE TRIGGERED SOURCE LOCATED AT THE CENTER OF THE DIE. THERE WILL BE DECAY CURVES TO THE NUMBER OF SCALED MODEL (E.G. 55)).
614

GENERATE CORECTION MAP (E.G., CORRECTION MAP THAT IS AN ARRAY OF P X P IS GENERATED FOR EACH SCALED MODEL TO ACCOMMODATE FOR THE EDGE EFFECTS. THERE WILL BE CORRECTION MAPS TO THE NUMBER OF SCALED MODEL SIMULATIONS (E.G. 55).
616

GENERATE LOOKUP TABLE (E. G., 55 DECAY CURVES AND CORRECTION MAPS ARE GENERATED AS A 2-DIMENSIONAL (DIE SIZE AND HTC) LOOKUP TABLE READY FOR PREDICTIONS).
618

FIGURE 6A (CONT)

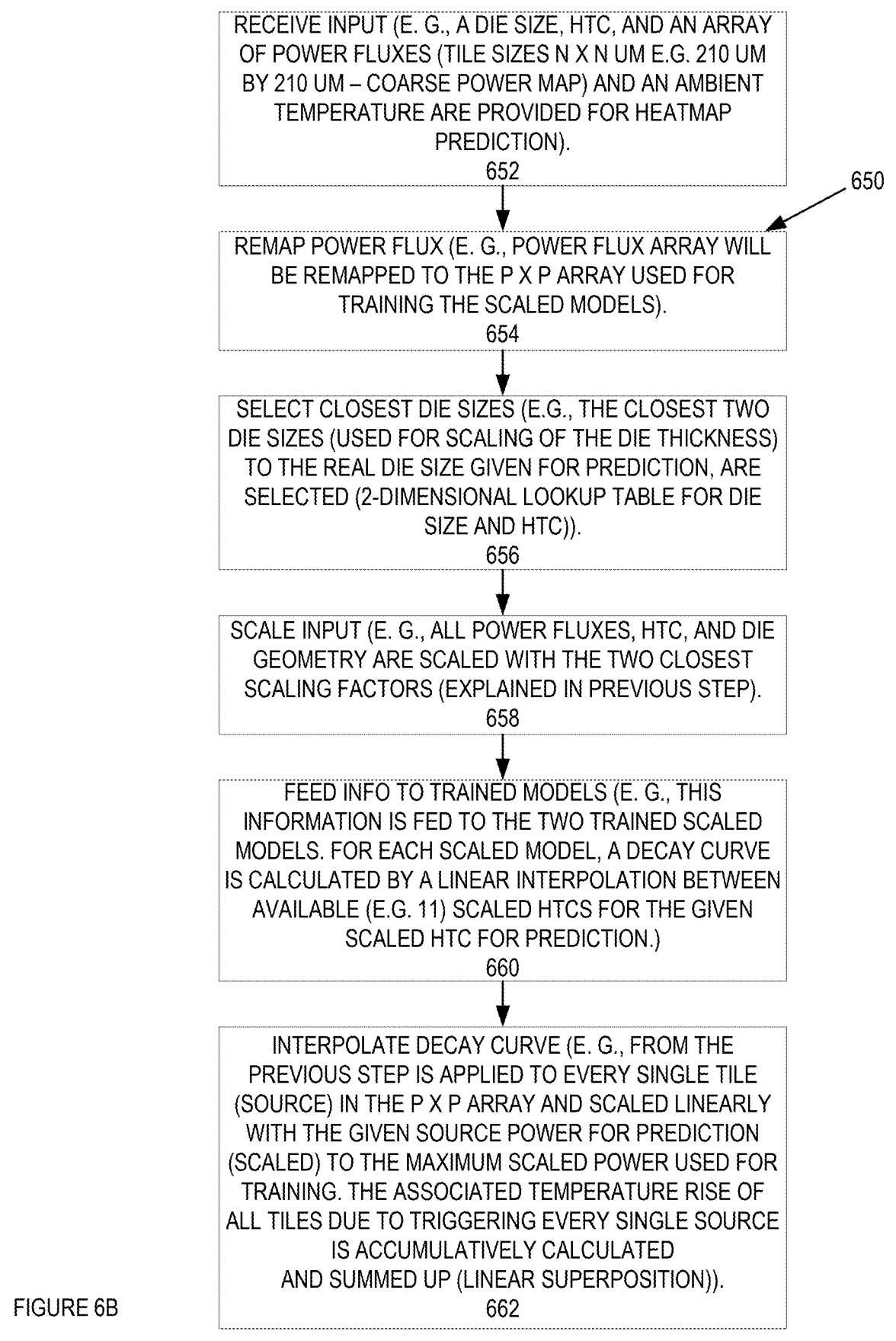

RECEIVE INPUT (E. G., A DIE SIZE, HTC, AND AN ARRAY OF POWER FLUXES (TILE SIZES N X N UM E.G. 210 UM BY 210 UM – COARSE POWER MAP) AND AN AMBIENT TEMPERATURE ARE PROVIDED FOR HEATMAP PREDICTION).
652

650

REMAP POWER FLUX (E. G., POWER FLUX ARRAY WILL BE REMAPPED TO THE P X P ARRAY USED FOR TRAINING THE SCALED MODELS).
654

SELECT CLOSEST DIE SIZES (E.G., THE CLOSEST TWO DIE SIZES (USED FOR SCALING OF THE DIE THICKNESS) TO THE REAL DIE SIZE GIVEN FOR PREDICTION, ARE SELECTED (2-DIMENSIONAL LOOKUP TABLE FOR DIE SIZE AND HTC)).
656

SCALE INPUT (E. G., ALL POWER FLUXES, HTC, AND DIE GEOMETRY ARE SCALED WITH THE TWO CLOSEST SCALING FACTORS (EXPLAINED IN PREVIOUS STEP).
658

FEED INFO TO TRAINED MODELS (E. G., THIS INFORMATION IS FED TO THE TWO TRAINED SCALED MODELS. FOR EACH SCALED MODEL, A DECAY CURVE IS CALCULATED BY A LINEAR INTERPOLATION BETWEEN AVAILABLE (E.G. 11) SCALED HTCS FOR THE GIVEN SCALED HTC FOR PREDICTION.)
660

INTERPOLATE DECAY CURVE (E. G., FROM THE PREVIOUS STEP IS APPLIED TO EVERY SINGLE TILE (SOURCE) IN THE P X P ARRAY AND SCALED LINEARLY WITH THE GIVEN SOURCE POWER FOR PREDICTION (SCALED) TO THE MAXIMUM SCALED POWER USED FOR TRAINING. THE ASSOCIATED TEMPERATURE RISE OF ALL TILES DUE TO TRIGGERING EVERY SINGLE SOURCE IS ACCUMULATIVELY CALCULATED AND SUMMED UP (LINEAR SUPERPOSITION)).
662

FIGURE 6B

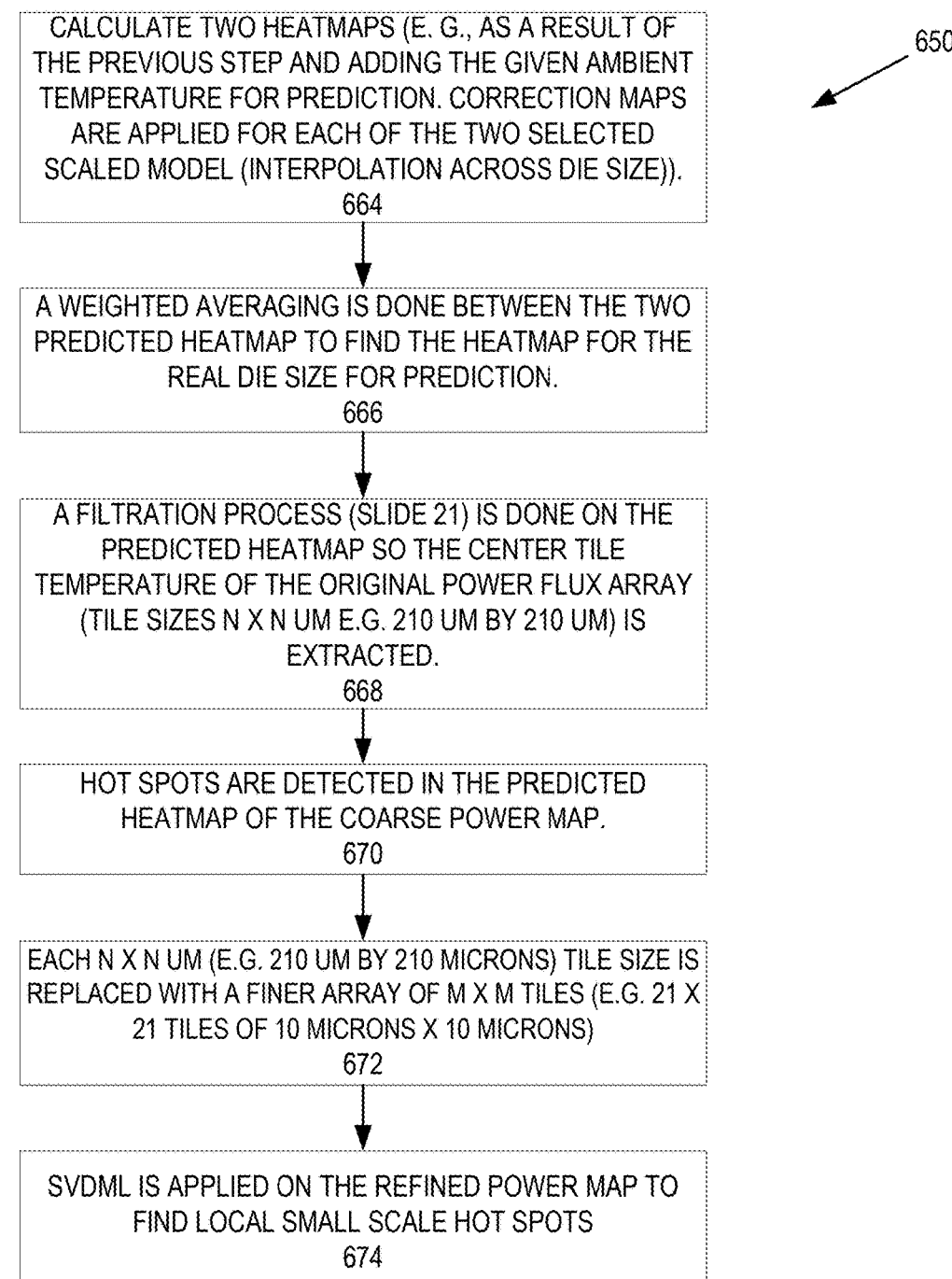

650

CALCULATE TWO HEATMAPS (E. G., AS A RESULT OF THE PREVIOUS STEP AND ADDING THE GIVEN AMBIENT TEMPERATURE FOR PREDICTION. CORRECTION MAPS ARE APPLIED FOR EACH OF THE TWO SELECTED SCALED MODEL (INTERPOLATION ACROSS DIE SIZE)).
664

A WEIGHTED AVERAGING IS DONE BETWEEN THE TWO PREDICTED HEATMAP TO FIND THE HEATMAP FOR THE REAL DIE SIZE FOR PREDICTION.
666

A FILTRATION PROCESS (SLIDE 21) IS DONE ON THE PREDICTED HEATMAP SO THE CENTER TILE TEMPERATURE OF THE ORIGINAL POWER FLUX ARRAY (TILE SIZES N X N UM E.G. 210 UM BY 210 UM) IS EXTRACTED.
668

HOT SPOTS ARE DETECTED IN THE PREDICTED HEATMAP OF THE COARSE POWER MAP.
670

EACH N X N UM (E.G. 210 UM BY 210 MICRONS) TILE SIZE IS REPLACED WITH A FINER ARRAY OF M X M TILES (E.G. 21 X 21 TILES OF 10 MICRONS X 10 MICRONS)
672

SVDML IS APPLIED ON THE REFINED POWER MAP TO FIND LOCAL SMALL SCALE HOT SPOTS
674

| Scaled HTC (W/m²K) | Die size (mm) | | | | | | | |
|---|---|---|---|---|---|---|---|---|
| | 4 | 6 | 8 | 12 | 16 | 20 | 24 | 30 |
| 0.4 | 100 | 67 | 50 | 33 | 25 | 20 | 17 | 13 |
| 0.75 | 188 | 125 | 94 | 63 | 47 | 38 | 31 | 25 |
| 1 | 250 | 167 | 125 | 83 | 63 | 50 | 42 | 33 |
| 1.5 | 375 | 250 | 188 | 125 | 94 | 75 | 63 | 50 |
| 2 | 500 | 333 | 250 | 167 | 125 | 100 | 83 | 67 |
| 3 | 750 | 500 | 375 | 250 | 188 | 150 | 125 | 100 |
| 4 | 1000 | 667 | 500 | 333 | 250 | 200 | 167 | 133 |
| 6 | 1500 | 1000 | 750 | 500 | 375 | 300 | 250 | 200 |
| 8 | 2000 | 1333 | 1000 | 667 | 500 | 400 | 333 | 267 |
| 12 | 3000 | 2000 | 1500 | 1000 | 750 | 600 | 500 | 400 |
| 15 | 3750 | 2500 | 1875 | 1250 | 938 | 750 | 625 | 500 |

Actual HTC (W/m2K)

FIGURE 12

1306
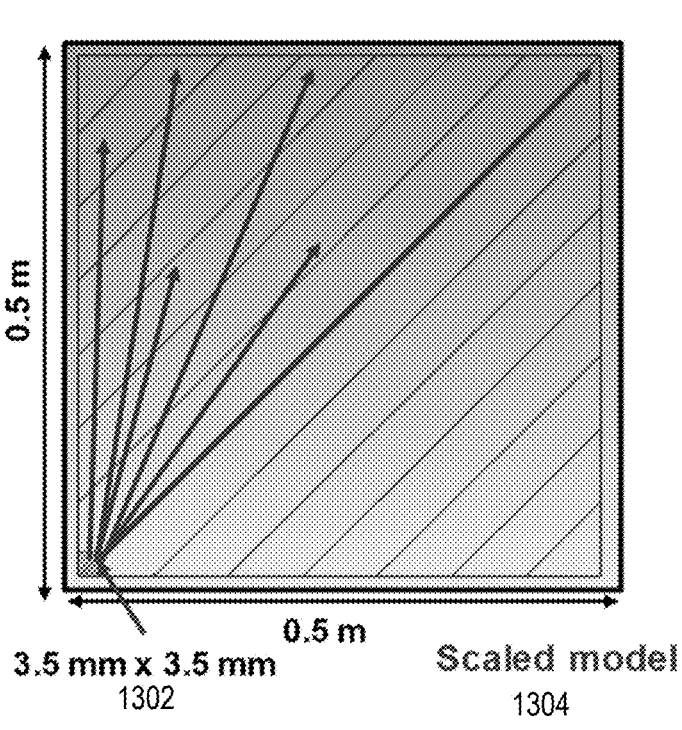
0.5 m
0.5 m
3.5 mm x 3.5 mm
1302
Scaled model
1304
1308
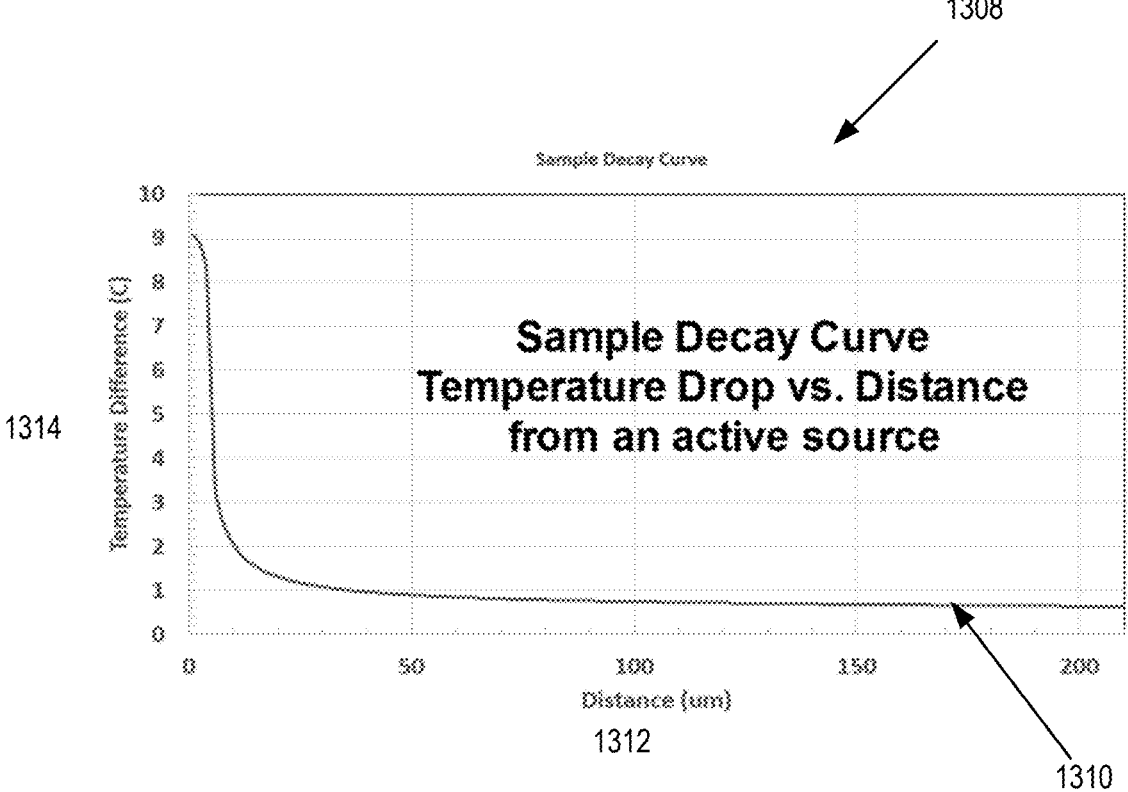
1314
1312
1310
FIGURE 13

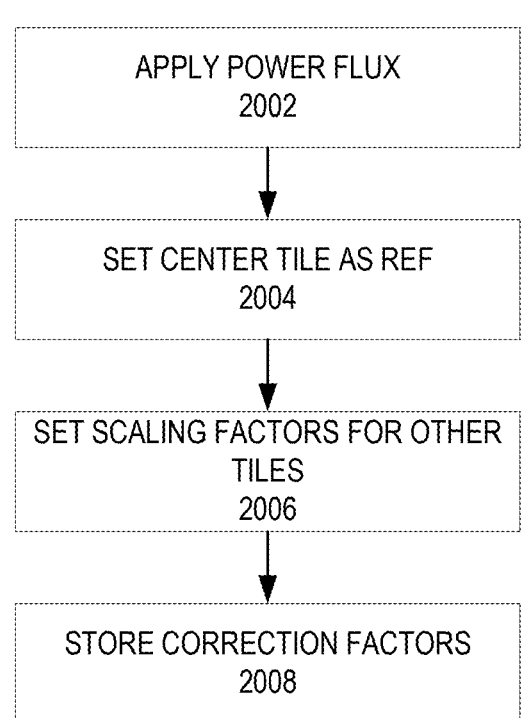
FIGURE 20

2500
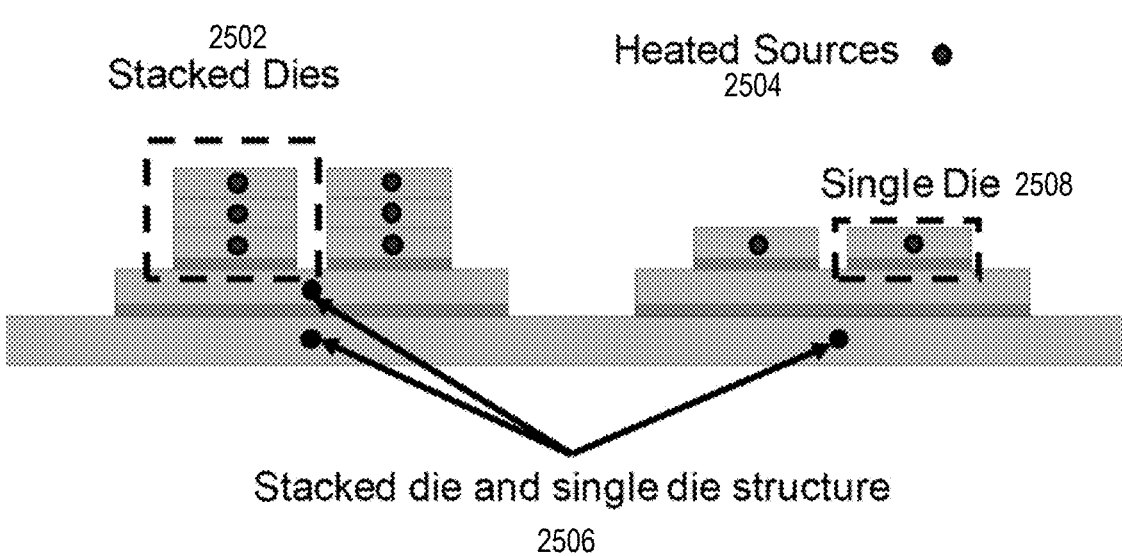
Figure 25

2600

2602

PREDICTION OF STEADY STATE HEAT MAPS FOR CHIP THERMAL ANALYSIS

CROSS-REFERENCE TO RELATED APPLICATION

This application claims the benefit of U.S. Provisional Application No. 63/253,383 filed Oct. 7, 2021, which is incorporated herein by reference in its entirety.

FIELD OF INVENTION

This invention relates generally to thermal analysis and more particularly to predicting a heat map for chip thermal analysis using a physics aware solution under steady state formulations.

BACKGROUND OF THE INVENTION

Integrated circuit level electronics thermal management challenges can use an accurate and detailed modeling of a large array of sources (e.g., 100×100, 250×250, or millions) on the die. For each die configuration, it is important to have the ability to compute a heat map accurately and efficiently for any combination of power values for these sources. The number of input parameters can easily be in the tens of thousands or millions, making conventional computational methods/tools prohibitively expensive. The challenging part of this problem is that the chip size and boundary conditions can vary. Thus, any modeling of the chip should address a possible geometrical variation of the die size.

SUMMARY OF THE DESCRIPTION

A method and apparatus of a device of predicting a heat map for a die model is described. In an exemplary embodiment, the device receives a die model for representing the die and a boundary condition applicable to the die, the die model including dimensions of the die and its 3D structure. In addition, the device may include scaling the dimensions of the die model and the boundary condition, wherein the dimensions of the die model are scaled to a target die size, the scaled dimensions including a scaled die thickness. Furthermore, each trained die model includes a surface of the target die size, different trained die models having different die thickness, the plurality of trained die models trained under a plurality of boundary conditions, each trained die model having a plurality of decay curves associated with the plurality of boundary conditions. The method may additionally include determining a relationship between the scaled boundary condition and the plurality of boundary conditions. In addition, the method may include determining a decay curve for the die model according to a combination of decay curves associated with the plurality of boundary conditions for the one or more trained die models using the relationship with the use of appropriate interpolation schemes. Furthermore, the method may include generating the die heat map based on the decay curve determined for the die model.

In another embodiment, the method trains a plurality of die models for predicting a die heat map. In an exemplary embodiment, the method receives a plurality of real die models, the plurality of die models representing a die size range, boundary condition range, and a power flux range. In addition, the method can include scaling the plurality of real die models to generate a plurality of scaled die models sharing a common dimension of scaled die sizes of the scaled die models. Furthermore, the method includes simulating each scaled die model with a range of scaled boundary conditions to obtain a range of decay curves for the scaled die model, wherein the range of scaled boundary conditions for the scaled die model corresponds to a range of unscaled boundary conditions for a corresponding real die model of the scaled die model, and wherein the range of unscaled boundary conditions substantially includes the range of boundary conditions associated with the real die models. The method additionally can include generating a model to predict a decay curve for a die from a size and boundary conditions of the die based on the common dimension, the range of scaled boundary conditions and ranges of decay curves obtained for the plurality of scaled die models.

Other methods and apparatuses are also described.

BRIEF DESCRIPTION OF THE DRAWINGS

The present invention is illustrated by way of example and not limitation in the figures of the accompanying drawings in which like references indicate similar elements.

FIG. 6A is a flow diagram on one embodiment of a process to generate multiple trained die models.

FIG. 6B is a flow diagram on one embodiment of a process to predict a die heat map using the multiple trained die models.

FIG. 12 is an illustration of one embodiment of a table lookup comparing die size and scaled heat transfer coefficient (HTC).

FIG. 13 is a block diagram illustrating a decay curve of a temperature drop versus distance for a scaled model.

FIG. 20 is a flow diagram of one embodiment of a process to determine edge effect correction for a die model.

FIG. 25 is an illustration of one embodiment of a stacked die with multiple heat sources.

DETAILED DESCRIPTION

Figure 1:
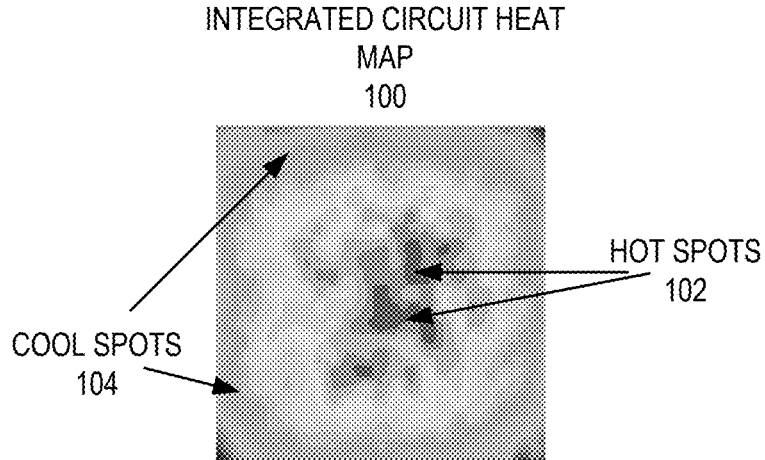
FIG. 1 is an illustration of one embodiment of an integrated circuit heat map.

A method and apparatus of a device predicting a heat map for a die model is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

A method and apparatus of a device predicting a heat map for a die model is described. In one embodiment, integrated circuit level electronics thermal management can use an accurate and detailed modeling of a large array of sources (e.g., 100×100, 250×250, or millions) on the die. For each die configuration, it is important to have the ability to compute the heat map accurately and efficiently for any combination of power values for these sources. The number of input parameters can easily be in the tens of thousands or millions, making conventional computational methods/tools prohibitively expensive. The challenging part of this problem is that the chip size and boundary conditions can vary. Thus, any modeling of the chip should address a possible geometrical variation of the die size.

In one embodiment, a method has been developed to not only predict the heat map on the entire chip but also provide the ability to track the localized hotspots on the chip, accurately and efficiently. The method is based on efficient and lean training, leveraging the linearity of the physics and the symmetry aspects of this use case, scaling (Buckingham theorem), interpolation and machine learning techniques for reasonably accurate and efficient prediction of the heat map for the chip, under steady state formulations. The results from this method are compared with the results from Computational Fluid Dynamics (CFD) based solutions.

In one embodiment, the heat map is first predicted using Scaling/Superposition/Multi-Dimensional Interpolation/Remapping (SSMR) at a larger scale with the die being masked with rougher tile size N×Num (e.g., 210 um×210 um) sources. After finding the hot spots in the larger scale model, a higher resolution power map with M×M um (e.g., 10 um×10 um) sources is used to predict the localized hot spots using Singular Vector Decomposition, Machine Learning (SVDML).

In one embodiment, the method receives a real-world die model that can represent a die in the real-world. In this embodiment, the real-world die model is scaled to multiple different scaled die models. In this embodiment, there are multiple real-world die models that are scaled to a target die size. In one embodiment, each of the real-world die models has dimensions of length, width, and thickness. In this embodiment, the real-world die models are scaled to a target dimension (e.g., length or width), where the scaling factor can be the same or different for the different real-world die models. By scaling the real-world die models, the scaled die models can be trained for heat map prediction in the scaled domain. In this embodiment, a scaled domain is a domain where the die dimensions, die boundary conditions, power flux, and/or other die model parameters are scaled. For example, and in one embodiment, if the target length or width of the die model is 1 m and the real-world model is 30 mm in length or width, then the scaling factor would be 33.33. This scaling factor would be applied to the die model dimension (e.g., planar dimensions, such as length or width), boundary conditions (e.g., heat transfer coefficient), power flux, and/or other die model parameters.

With these scaled models, in one embodiment, the method trains the scaled die models in the scaled domain using one or more of a variety of techniques (e.g., Computational Fluid Dynamics, Finite Element Analysis, Numerical simulations, and/or other techniques). In this embodiment, the training can include generating a temperature decay curve that shows the temperature drop vs. distance from a source located at the center of the die model. In addition, the training can generate a correction map for each of the trained die models, where the correction map compensates for an edge effect of the model. In addition, the training method generates a lookup table that relates scaled die thicknesses, scaled boundary conditions, and unscaled boundary conditions. The heat map prediction method will later use this lookup table to lookup the trained models that are close in parameter values (e.g., scaled die thickness, scaled boundary conditions, etc.).

With these trained die models, a heat map can be predicted for a real-world die model. In one embodiment, the prediction method scales the input die thickness of the real-world die model using a scaling factor. The scaling factor for this real-world model would depend on the dimensions of the real-world die model and the target size of the scale die model. For example, and in one embodiment, if the target length or width is 1 m and the die model length or width is 25 mm, the scaling factor would be 40. With the scaled die dimension, the prediction method can use the lookup table to look for a pair of scaled die thicknesses that are closest to the scaled die thickness of the scaled real-world die model. In addition, the prediction method selects a pair of scaled boundary conditions for each of the selected pair of trained models. For each pair of scaled boundary conditions, the prediction method retrieves a pair of decay curves and interpolates between each pair of decay curves. With the pair of interpolated decay curves, the prediction method generates a pair of preliminary heatmaps. These preliminary heatmaps are corrected using a correction map and a weighted interpolation of the two corrected preliminary heatmaps yields a corrected heatmap. The prediction method further filters to find the center tile temperature of the original source, power array, or map.

In one embodiment, a unique physics aware approach to build an efficient reduced order solution for steady state chip thermal analysis is described. In addition, this approach has efficient training data by leveraging symmetry (e.g., geometry) and linearity (of the physics) to significantly reduce redundancy (using advanced superposition techniques) and hence the overall computational effort required to generate the training data. Furthermore, the approach is a non-dimensional method that uses interpolation. In one embodiment, scalability requirements are effectively addressed using anon-dimensional approaches and high order regression interpolation techniques for training data generation. The method additionally is an efficient, accurate method (less than 10% error) with superior scalability (tens of thousands of sources) compared to conventional approaches (CFD/FEA).

FIG. 1 is an illustration of one embodiment of an integrated circuit heat map 100. In FIG. 1, the integrated circuit heat map 100 is a data visualization technique to illustrate thermal levels of different sections of an integrated circuit. In one embodiment, an integrated circuit can include thousands or even millions of separate components and a heat map can be used to determine if there are sections of the integrated circuit that are too hot or too cold. With a potential of thousands or millions of heat sources, having a view of the spatial thermal levels of the integrated circuit allows a chip designer of view of potential trouble spots on the integrated circuit. In FIG. 1, there are cool spots 104 of the integrated circuit heat map 100, where these spots 100 show a lower temperature. In contrast, the integrated circuit heat map 100 can also include hot spots 102. In this embodiment, these hot spots 102 can signify a section of the integrated chip that could overheat or cause thermal issue(s) for those components associated with the hot spots 102.

Figure 2:
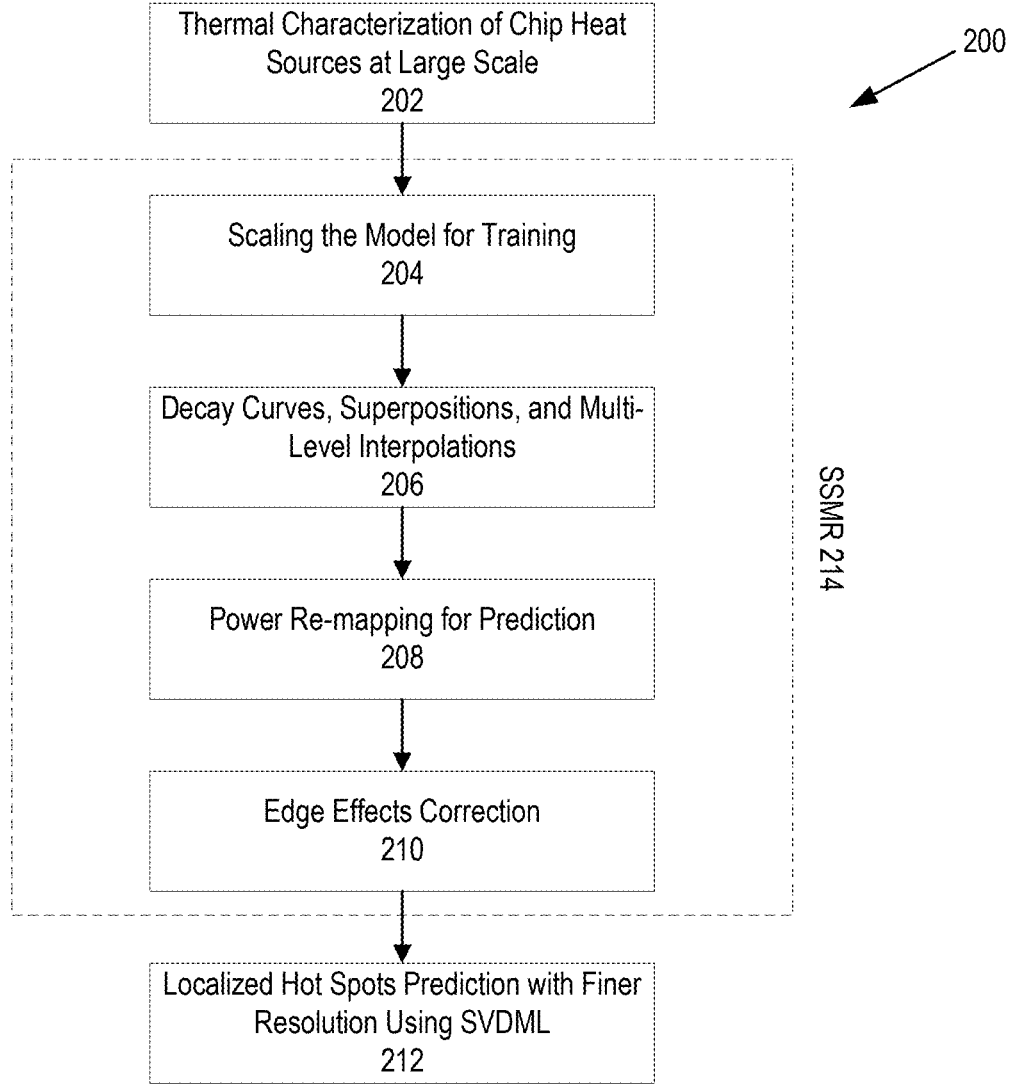
FIG. 2 is a flow diagram of one embodiment of a process for generating an integrated circuit heat map.

A heat map can be determined empirically by designing the integrated circuit and physically measuring, but this is prohibitively expensive. Alternatively, the integrated circuit can be designed and modeled using computational fluid dynamics (CFD). However, modeling using CFD can also be computationally expensive and complex when modeling many different integrated circuit designs. In one embodiment, a less costly and more efficient modeling of integrated circuit heat maps can be done by efficient and lean training, leveraging the linearity of the physics and the symmetry aspects of this use case, scaling, e.g., the Buckingham theorem, interpolation and Machine Learning techniques for reasonably accurate and efficient prediction of the heat map for the chip under steady state formulations. FIG. 2 is a flow diagram of one embodiment of a process 200 for generating an integrated circuit heat map. In one embodiment, a modeling device performs process 200 to determine a heat map. In this embodiment, the modeling device can be a personal computer, laptop, server, mobile device (e.g., smartphone, laptop, personal digital assistant, music playing device, gaming device, etc.), and/or any device capable of processing data. In FIG. 2, process 200 begins by thermally characterizing the chip heat sources at large scale at block 202. In one embodiment, process 200 uses a multi-layer interconnect die model. In this embodiment, typical values of silicon conductivity, interconnect, and insulation conductivity, and interconnect sublayer thickness, insulation, total die thickness including substrate thickness (e.g., 100 μm) are used. In addition, the die size can vary in 3DIC structure (e.g., 4 mm to 30 mm). Furthermore, process 200 can apply a system level simulation based convective Heat Transfer Coefficient (HTC) on the top and bottom surfaces of the die.

Process 200 performs SSMR over blocks 204-210. At block 204, process 200 scales the model for training. In one embodiment, process 200 can scale the model using a dimension of the planar direction while the thickness direction is fixed for the same chip technology. Training of the die models and heatmap predictions are then performed in the scaled domain. In one embodiment, the scaled domain is a domain where a die model dimension is scaled to a target size and other parameters of the die model are scaled as well. The temperature of the die model, however, is not scaled. Thus, the temperature rises determined in the scaled domain translated to the unscaled domain. Scaling is further described in the FIGS. 4-6A below. Process 200 handles decay curves, superpositions, and multi-level interpolations at block 206. This is further described in FIG. 7 below. At block 208, process 200 performs a power re-mapping for prediction. In one embodiment, process 200 uses the power re-mapping to distribute the input power automatically and efficiently to a larger array of P×P (e.g., 143 um×143 um) (coarse grid to fine grid conversion). Process 200 corrects the model for edge effect at block 210. In one embodiment, edge effects can increase the temperature of the heat map predicted by the model, which can lead to skewed values near the edge of the heat map. In this embodiment, process 200 compensates for the edge effect predicted by the heat map. Correcting the edge effect is further described in FIGS. 17-20 below. At block 212, process 200 predicts localized hot spots with finer resolution using SVDML. SVDML is further described in FIG. 25 below.

Figure 3:
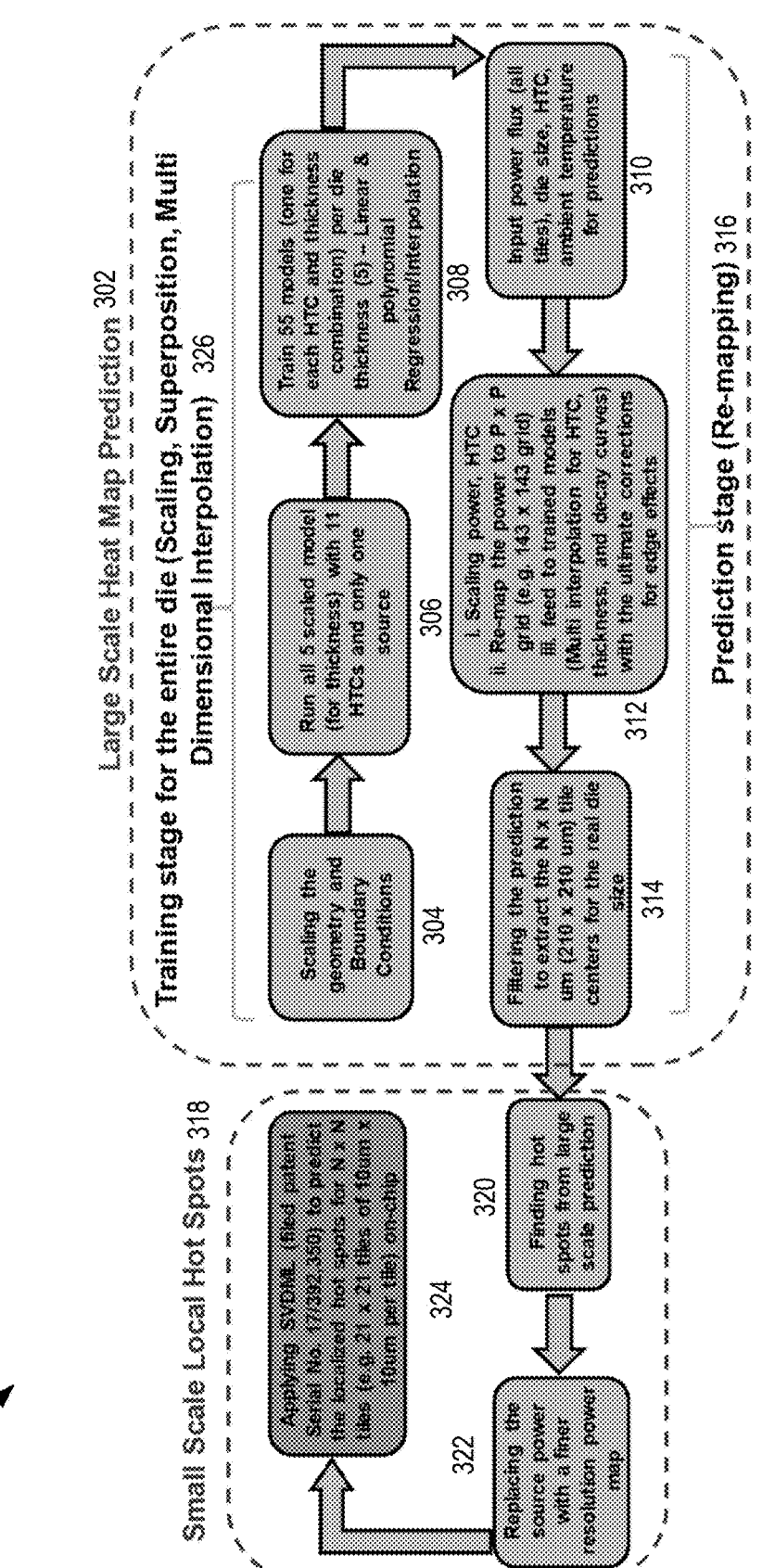
FIG. 3 is a flow diagram of one embodiment of a process to predict a large-scale heat map.

FIG. 3 is a flow diagram of one embodiment of a process 300 to predict a large-scale heat map. In one embodiment, a modeling device performs process 300 to determine a heat map. In FIG. 3, process 300 includes two parts, a large-scale heat map prediction 302 and a small scale local hot spots prediction 318. In one embodiment, the large-scale heat map prediction 302 predicts heat map on a coarse grid (e.g., a grid with a size 210 um×210 um). Process 300 feeds this coarse grid heat map to the small scale local hot spot predictor 318, where the small scale local hot spot predictor 318 predicts localized hot spots for the heat map.

In FIG. 3, process 300 begins by performing a training stage for the die (326) (e.g., scaling, superposition, and multi-dimensional interpolation). In one embodiment, process 300 performs the training stage by scaling the geometry and boundary conditions at block 306. In one embodiment, the method receives a real-world die model that can represent a die in the real-world. In this embodiment, the real-world die model is scaled to multiple different scaled die models. In this embodiment, there are multiple real-world die models that are scaled to a target die size. In one embodiment, each of the real-world die models have dimensions of length, width, and thickness. In this embodiment, the real-world die models are scaled to a target length or width, where the scaling factor can be the same or different for the different real-world die models. By scaling the real-world die models, the scaled die models can be trained for heat map prediction in the scaled domain. In this embodiment, a scaled domain is a domain where the die dimensions, die boundary conditions, power flux, and/or other die model parameters are scaled. For example, and in one embodiment, if the target length or width of the die model is 1 m and the real-world model has 30 mm length or width, then the scaling factor would be 33.33. This scaling factor would be applied to the die model dimension (e.g., planar dimensions, such as length or width), boundary conditions (e.g., heat transfer coefficient), power flux, and/or other die model parameters.

With these scaled models, in one embodiment, the method trains the scaled die models in the scaled domain using one or more of a variety of techniques (e.g., Computational Fluid Dynamics, Finite Element Analysis, Numerical simulations, and/or other techniques). In this embodiment, the training can include generating a temperature decay curve that illustrates a drop in a temperature rise vs. distance from a source located at the center of the die model. In addition, the training can generate a correction map for each of the trained die models, where the correction map compensates for an edge effect of the model. In addition, the training method generates a lookup table that relates scaled die thicknesses, scaled boundary conditions, and unscaled boundary conditions. The heat map prediction method will later use this lookup table to lookup the trained models that are close in parameter values (e.g., scaled die thickness, scaled boundary conditions, etc.). In one embodiment, process 300 scales up in one of the planar directions (e.g., length or width) while the input thickness is scaled from a fixed thickness for the same chip technology. In this embodiment, thickness, if not scaled correctly, can introduce significant errors (20-25%). In a further embodiment, process 300 scales the geometry and boundary conditions of K different die models. In this embodiment, the different scaled die models have different thicknesses. Scaling is further described in the FIG. 5 below. At block 306, process 300 runs the scaled die models (for thickness) with R different HTCs using a source. While in one embodiment, process 300 runs just using one heat source, in alternate embodiments, process 300 runs using more than one heat source. In one embodiment, the number of scaled die models to be trained is equal to the number of die thicknesses times the number of scaled boundary conditions times the number of power sources. For example, and in one embodiment, if there are 5 die thicknesses, 11 different boundary conditions (e.g., 11 different heat transfer coefficients (HTC)), and one power source, there would be 55 models. Process 300 trains the K×R die models (e.g., one model for each of the K thicknesses and R HTCs). In one embodiment, process 300 trains the K×R models by linear and polynomial regression and/or interpolations. In another embodiment, process 300 trains the die models using a variety of one or more techniques (e.g., Computational Fluid Dynamics, Finite Element Analysis, Numerical simulations, and/or other techniques). In one embodiment, the training of the die models occurs in the scaled domain.

With the trained models, process 300 performs the predictions stage that includes a re-mapping (316). With these trained die models, a heatmap can be predicted for a real-world die model. In one embodiment, the prediction method scales the input die thickness of the real-world die model using a scaling factor. The scaling factor for this real-world model would depend on the dimensions of the real-world die model and the target size of the scale die model. For example, and in one embodiment, if the target length or width is 1 m and the die model dimension has a 25 mm length or width, the scaling factor would be 40. With the scaled die dimension, the prediction method can use the lookup table to look for a pair of scaled die thicknesses that are closest to the scaled die thickness of the scaled real-world die model. In addition, the prediction method selects a pair of scaled boundary conditions for each of the selected pair of trained models. For each of the pair of scaled boundary conditions, the prediction method retrieves a pair of decay curves and interpolates between each pair of decay curves. With the pair of interpolated decay curves, the prediction method generates a pair of preliminary heatmaps. These preliminary heatmaps are corrected using a correction map and a weighted interpolation of the two corrected preliminary heatmaps yields a corrected heatmap. The prediction method further filters to find the center tile temperature of the original source, power array, or map.

At block 310, process 300 receives the input parameters for the predictions stage (e.g., input power flux (for some or all tiles), die size, HTC(s), ambient temperature for predictions, and/or other input). In one embodiment, the input includes a real-world die model. Process 300 re-maps the power flux to a coarse grid (e.g., 143×143 grid) from the scaling at block 312. In one embodiment, process 300 scales the power and HTC, where the power is the power array in the inputted real-world sized die.). In addition, at block 312, process 300 re-maps the power to P×P grid (e.g., 143×143 grid) and is fed to trained die models (e.g., multi-interpolation for HTC, thickness, and decay curves) with the corrections for edge effects. In one embodiment, process 300 generates a preliminary prediction heatmap for the die model. At block 314, process 300 filters the prediction to extract the N×Num (210×210 um) tile centers for the real die size.

In one embodiment, the output of the large-scale heat map prediction 302 (a heatmap) is fed into the small scale local hot spots prediction 318. At block 320, process 300 receives the output of the large-scale heat map prediction 302 and finds hot spot from the large-scale heat map prediction 302. Process 300 replaces the source power with a filter resolution power map at block 322. At block 324, process 300 applies SVDML to predict the localized hot spots for Rx R tiles (e.g., 21×21 tiles of 10 um×10 um per tile) on-chip.

Figure 4:
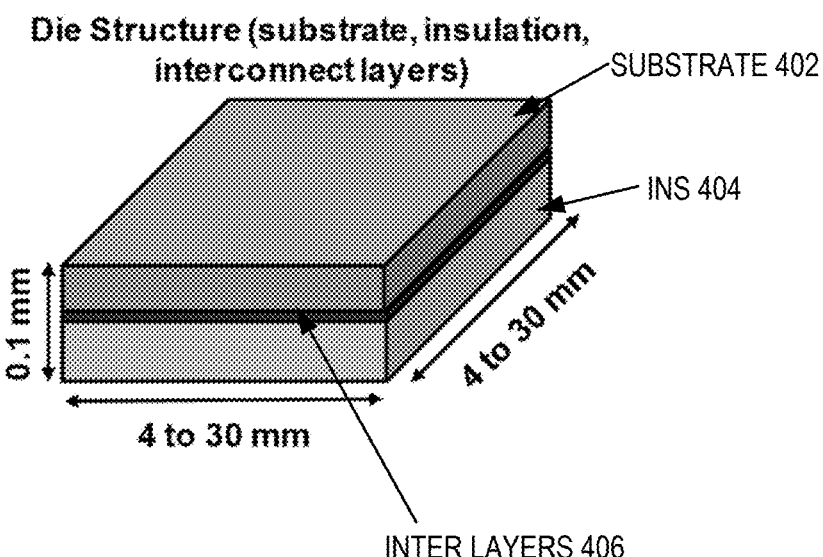
FIG. 4 is an illustration of one embodiment of die model.

FIG. 4 is an illustration of one embodiment of die model 400. In one embodiment, a die model is a model of an integrated circuit die, where a die is a small block of semiconducting material on which a given functional circuit is fabricated. In this embodiment, a typical multi-layer interconnect die model is used, in which, typical values of silicon conductivity, interconnect and insulation conductivity, and interconnect sublayer thickness, insulation, total die thickness including substrate thickness (e.g., 100 um) are used. For example, and in one embodiment, the die size can vary in 3DIC structure (e.g., 4 mm to 30 mm in the planar directions and 0.1 mm for a die thickness) and have substrate 402, insulation 4040 and interconnect 406 layers. In addition, a system level simulation based convective HTC is applied on the top and bottom surfaces of the die. In a further embodiment, the goal is to predict the heat map of the die that can vary in size (e.g., 4 mm to 30 mm). While in one embodiment, the die is masked with several heat sources that are modeled with N×N um (e.g., 210×210 um) size tiles, in alternate embodiments, the die is masked with a different sized tile. In another embodiment, the die model can have a planar dimension that is one of a square or a rectangle. If the die model is rectangular, the die model is scaled using the longest of the two planar dimensions (e.g., the longest one of the length or width). This die model can be one of the die models that are trained or can be a real-world die model that is used for a heatmap prediction.

In one embodiment, a method is developed to consolidate the training configurations into a single sized model using the Buckingham $\pi$ theorem and the smart scaling of the Physics for this setup. In this embodiment, the Buckingham $\pi$ theorem states that if there is a physically meaningful equation involving a certain number n of physical variables, then the original equation can be rewritten in terms of a set of $p=n-k$ dimensionless parameters, $\pi 1$, $\pi 2$, . . . , $\pi p$ constructed from the original variables. In addition, the theorem provides a method for computing sets of dimensionless parameters from the given variables, or non-dimensionalization, even if the form of the equation is still unknown.

Figure 5:
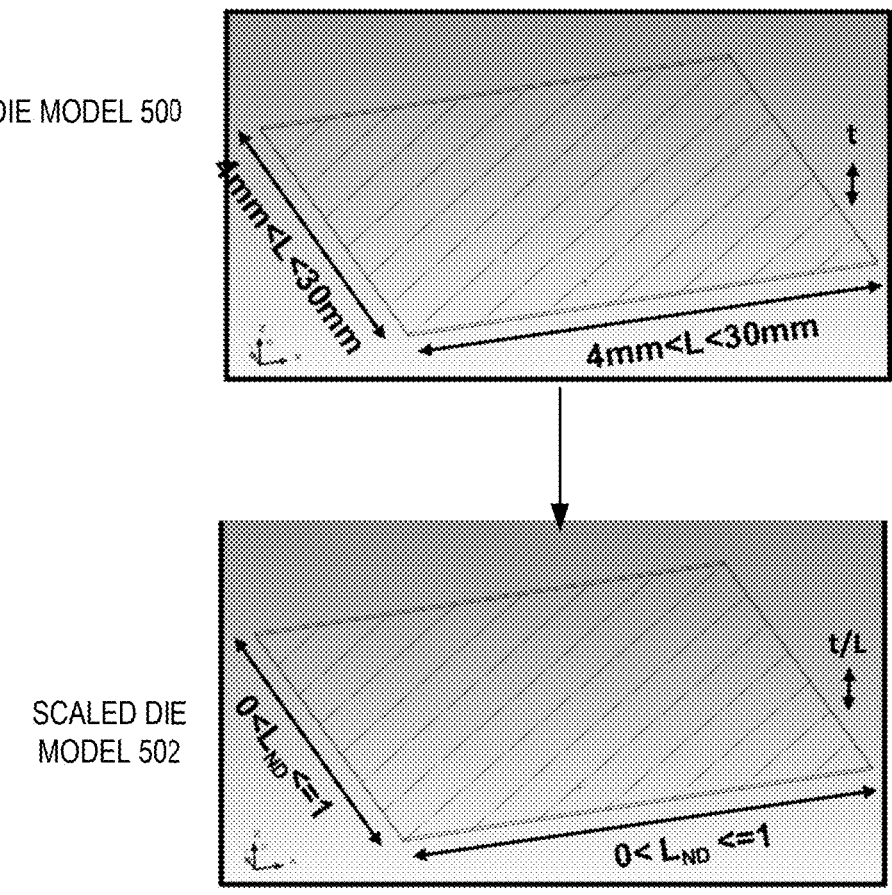
FIG. 5 is an illustration of one embodiment of normalized die model.

FIG. 5 is an illustration of one embodiment of scaled die model 502 that is scaled from die model 500. In one embodiment, the die model 500 has dimensions L×L, where 4 mm<L<30 mm and with a thickness of t. These dimensions are normalized to have a size $I_{ND} \times I_{ND}$ and thickness t/L. In addition, the HTC, heat, and surface flux are normalized as well. For example, and in one embodiment, if the HTC: h, Volumetric heat: $\dot{q}$, surface flux: $\dot{q}_s$, the scaled versions are: Scaled HTC:

$$\frac{hL}{k},$$

scaled volume heat:

$$\frac{\dot{q}L^2}{kT_\infty},$$

and scaled surface flux:

$$\frac{\dot{q}_s L}{kT_\infty}.$$

In one embodiment, this utilizes a steady state energy equation for conduction-only modeling in a non-dimensional form (constant properties). In one embodiment, the normalized die model is a non-dimensional form, where $$x^*=x/L, \ y^*=y/L, \ z^*=z/L, \ T^*=(T-T_\infty)/T_\infty$$

$\dot{q}$: volumetric heat generation (W/m³), $T_\infty$: Ambient temperature (K),
K: thermal conductivity of solid, $\dot{q}_s$: Surface Flux (W/m²)

$$k\left(\frac{\partial^2 T}{\partial x^2} + \frac{\partial^2 T}{\partial y^2} + \frac{\partial^2 T}{\partial z^2}\right) + \dot{q} = 0$$

Dimensional form $$\frac{\partial^2 T^*}{\partial x^{*2}} + \frac{\partial^2 T^*}{\partial y^{*2}} + \frac{\partial^2 T^*}{\partial z^{*2}} + \frac{\dot{q}L^2}{kT\infty} = 0$$

Non-dimensional form
In addition, the boundary conditions are normalized:

$$-k\frac{\partial T}{\partial z}\bigg|_{z=0,t} = h(T_s - T_\infty)$$

$$-\frac{\partial T^*}{\partial z^*}\bigg|_{z^*=0,t/L} = \frac{hL}{k}T_s^*$$

In this embodiment, the same properties and ambient temperature are used for the scaled and the real models:

$$h \rightarrow hND/L, \ \dot{q}_s \rightarrow \dot{q}_{s,ND}/L$$

FIG. 6A is a flow diagram on one embodiment of a process 600 to generate multiple trained die models. In FIG. 6A, process 600 begins by process 600 receives inputs for the die model training. In a further embodiment, this input can be multiple die models that are used for training. For example, and in one embodiment, for a given application of 3D IC designs, die size range, HTC range, source power flux range (e.g., tile power flux range) of these multiple die models are inputs to training. In one embodiment, the die can be square or rectangular in shape, where the larger size in the planar direction is used as the scaling factor in case of rectangular shapes. At block 604, process 600 scales each of the multiple trained die models using a scaling factor. In one embodiment, the scaling factor can be same for each die model, can be different, or some combination thereof. In another embodiment, this information is used by the process 600 to scale the geometry, HTC range, and power flux range. The scaling factor for each die is the larger die size in the planer direction. In one embodiment, all die sizes should map to one scaled model (by using Buckingham theorem). In a further embodiment, for simulations of the scaled models, only one single tile (source) is used for the power flux and that source is located at the center of the die model. By scaling the real-world die models, the scaled die models can be trained for heat map prediction in the scaled domain. In this embodiment, a scaled domain is a domain where the die dimensions, die boundary conditions, power flux, and/or other die model parameters are scaled. For example, and in one embodiment, if a target size of the die model is 1 m and the real-world model is 30 mm, then the scaling factor would be 33.33. At block 606, process 600 determines a die thickness range. In one embodiment, the die thickness is the same for the input real-world die model and the planar dimensions. Thus, scaling to one single model is not possible. Therefore, several scaled models (e.g., 5 or more or less numbers of die thicknesses) are created instead of one based on selected die sizes in the die thickness range. In one embodiment, the number of different die thickness chosen is a balance between an accuracy versus speed for the training process). More die thicknesses increase the accuracy but at the expense of a speed of training. In addition, at a certain point, adding more die thicknesses does not increase the accuracy. In one embodiment, having the range of die thicknesses is to reduce the error in predictions. At block 608, process 600 determines a ranges of boundary conditions. In one embodiment, to cover the entire boundary condition range (e.g., HTC) for the real die size, several scaled HTC values (e.g., 11) are used for training. In one embodiment, a real range of HTCs is e.g., 100-500 W/m²K for most chip applications. For example, and in one embodiment, several HTCs (e.g., 11) can be picked to have at least five points for each scaled die in that range of 4-30 mm. Similar to the number of thickness points discussed above, this can be any number to deliver accuracy with reasonable training number. Furthermore, at block 610, the power flux value to be used for the training. In one embodiment, a maximum of the power flux range in real scale along with the maximum of the real die size in the planar direction (scaling factor) are used to calculate a single scaled power flux that can be across all scaled models (e.g., a maximum of all scaled power fluxes). Execution proceeds from 606, 608 and/or 610 to 612.

At block 612, process 600 trains the die models. In one embodiment, the combination of the scaled ranges for die thickness, boundary conditions, and power flux will result in several (e.g., 5×11×1=55) scaled models to run for training. The training can be done using one or more different techniques (e.g., Computational Fluid Dynamics, Finite Element Analysis, Numerical simulations, and/or other techniques). In one embodiment, the training of the die models occurs in the scaled domain. Process 600 outputs the result of the die model training at block 614. In one embodiment, the outcome of each simulation is a decay curve that shows the temperature drop vs. a distance from the triggered source located at the center of the die. There will be decay curves to the number of scaled model (e.g. 55).

At block 616, process 600 generates a correction map for each of the trained die models. In one embodiment, a correction map is used to compensate for edge effects. In one embodiment, a correction map is an array of P×P that is generated for each scaled model to accommodate for the edge effects. In this embodiment, there will be correction maps to the number of scaled model simulations (e.g., 55). Process 600 generates a lookup table that relates the scaled die thicknesses with the scaled boundary conditions (e. g., scaled HTCs) at block 618. In one embodiment, the lookup table further includes the number of decay curves generated at block 616 and correction maps are generated as a 2-dimensional (die size and HTC) lookup table ready for predictions. In one embodiment, this lookup table is used in the prediction for determining which of the trained die models to use for the prediction.

With the multiple trained models and lookup table, a heatmap can be predicted from a real-world die model. FIG. 6B is a flow diagram on one embodiment of a process 650 to predict a die heat map using the multiple trained die models. In FIG. 6B, process 650 receives input at block 652. In one embodiment, the input for prediction is a real-world die model that can include a die size, HTC, and an array of power fluxes (tile sizes N×N um e.g., 210 um by 210 um-coarse power map) and an ambient temperature are provided for heatmap prediction. At block 654, process 650 remaps that power flux. In one embodiment, the power flux is a power flux array is re-mapped to the P×P array used for training the scaled models. Process 600 selects two closest die sizes at block 656. In one embodiment, the closest two die sizes (used for scaling of the die thickness) to the real die size given for prediction, are selected (2-dimensional lookup table for die size and HTC). In this embodiment, process 650 uses the lookup table to select the closest two die sizes.

At block 658, process 650 scales some or all of the input of the real-world die model. In one embodiment, the power fluxes, HTC, and die geometry are scaled with the two closest scaling factors. Process 650 feeds the scaled input to the two trained scaled models for each scaled model. In this embodiment, process 650, for each scaled model, calculates a decay curve by a linear interpolation between available (e.g., 11) scaled HTCs for the given scaled HTC for prediction. At block 662, process 650 interpolates the decay curve. In one embodiment, the decay curve from the block 660 is applied to every single tile (source) in the P×P array and scaled linearly with the given source power for prediction (scaled) to the maximum scaled power used for training. In this embodiment, the associated temperature rise of the tiles due to triggering every single source is accumulatively calculated and summed up (e. g., using linear superposition).

Process 650 calculates two heatmaps at block 664. In one embodiment, process 650 calculates the two heatmaps as a result of the previous step and adding the given ambient temperature for prediction. Process 650 applies the correction maps for each of the two selected scaled model (interpolation across die size). At block 666, process 650 performs a weighted averaging. In one embodiment, process 650 performs a weighted averaging between the two predicted heatmap to find the heatmap for the real die size for prediction. Process 650 further performs a filtration process to extract the center tile temperature. In one embodiment, process 650 performs the filtration process on the predicted heatmap so the center tile temperature of the original power flux array (tile sizes N×N um, such as 210 um by 210 um) is extracted. At block 670, process 650 detects hot spots in the predicted heatmap of coarse power map.

At block 672, process replaces a coarse tile size with a finer tile size. In one embodiment, process 650 replaces each N×N um (e.g., 210 um by 210 um) tile size with a finer array of M×M tiles (e.g., 21×21 tiles of 10 um×10 um). Process 650 applies SVDML on the refined power map to find local small scale hot spots. SVDML is further described in FIG. 15 below.

Figure 7:
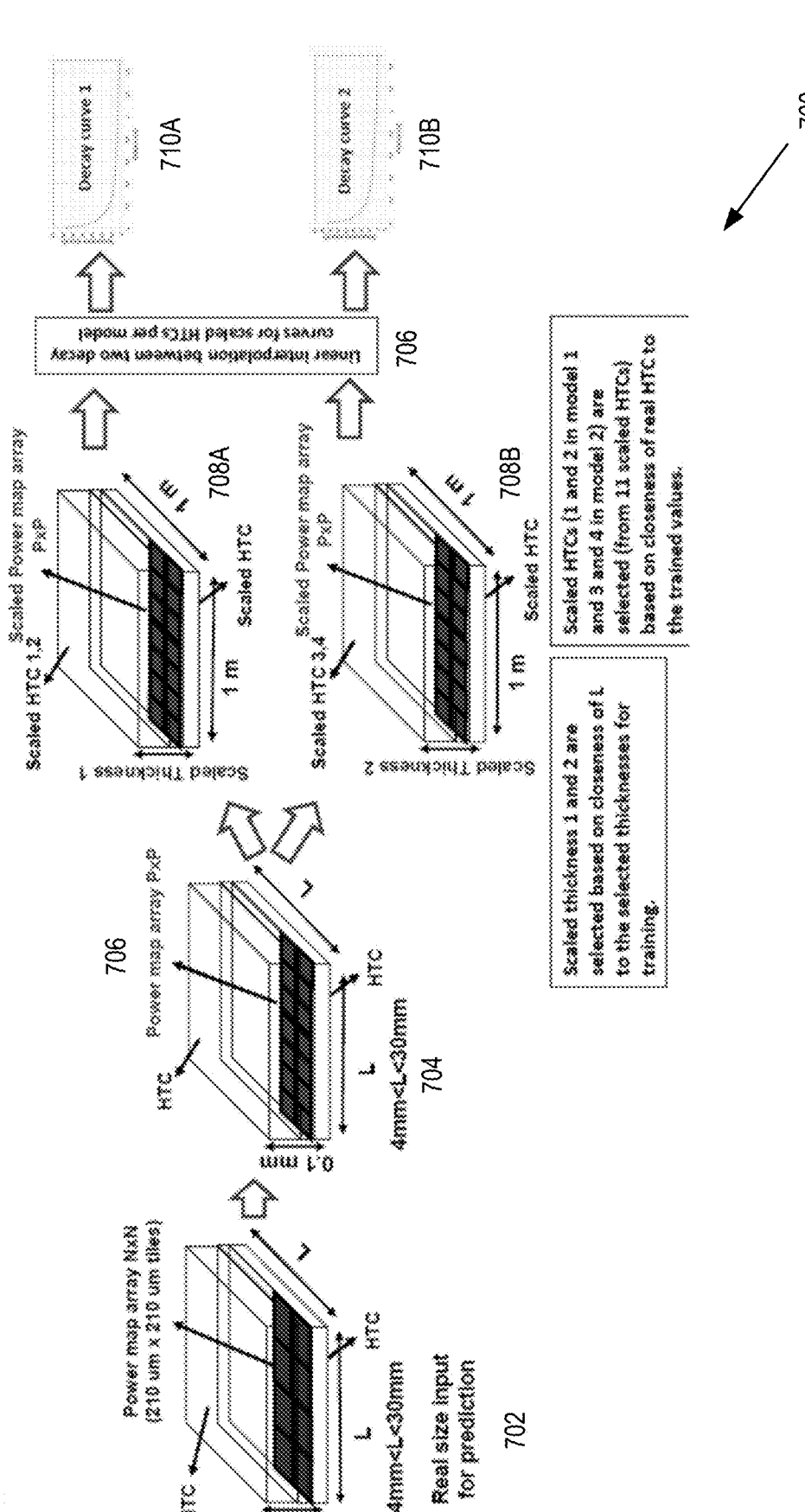
FIG. 7 is an illustration of one embodiment of an example workflow to predict a die heat map using the multiple trained die models.

FIG. 7 is an illustration of one embodiment of an example workflow 700 to predict a die heat map using the multiple trained die models. In FIG. 7, workflow 700 begins with an input real-world die model 702 that has a real-world size, where this model 702 can be used for predicting a heatmap. In one embodiment, the real-world die model 702 has a size with a thickness of, for example, 0.1 mm and length and width of L. In addition, the real-world model 702 includes a boundary condition with heat transfer coefficient (HTC) and a power map array of size N×N (e.g., 210 um×210 um sized tiles). The workflow 700 further re-maps the power array to a P×P array that was used to train the die models. In addition, in one embodiment, the length and width dimension, L, is between 4 mm and 30 mm. Workflow 700 scales the real-world die model 702 and selects two scaled thicknesses (scale thickness 1 and 2). In one embodiment, the scaled thicknesses 1 and 2 are selected based on the closeness of L to the selected thickness for training. In addition, the workflow 700 selects two scaled HTCs for each scaled thickness. For example, and in one embodiment, workflow 700 selects scaled HTC 1 & 2 for scaled thickness 1 (708A) and HTCs 3 & 4 for scaled thickness 2 (708B). Furthermore, each of 708A and 708B have a target sized dimension (e.g., 1 m). Workflow 700 performs a linear interpolation between two decay curves for each pair of scaled HTCs (706). In one embodiment, workflow 700 linearly combines decay curves associated with HTC 1 & 2 and scaled thickness 1 to produce decay curve 710A. In addition, workflow 700 linearly combines decay curves associated with HTC 3 & 4 and scaled thickness 2 to produce decay curve 710B.

Figure 8:
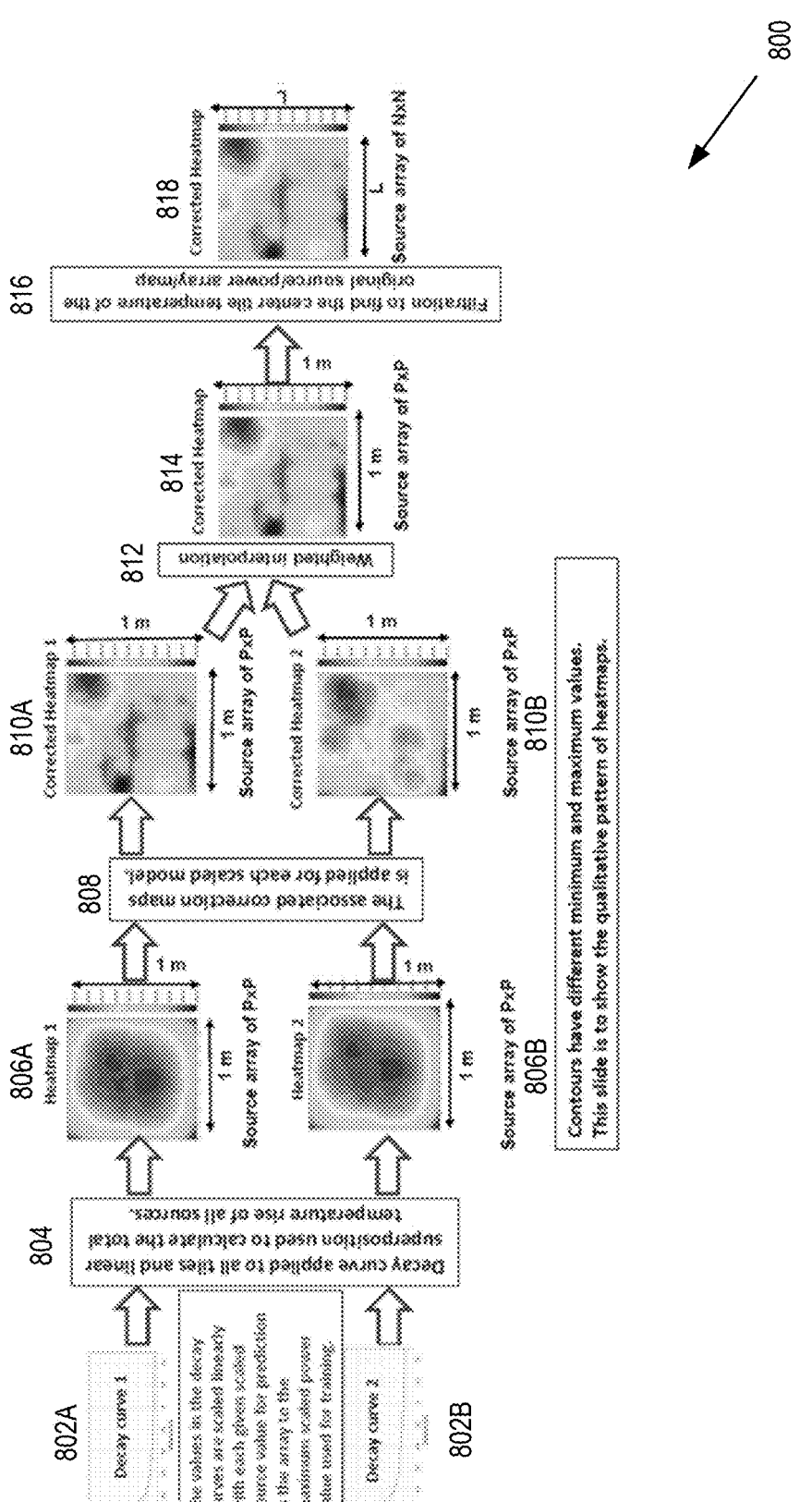
FIG. 8 is an illustration of one embodiment of an example workflow to predict a die heat map using the multiple trained die models (continued).

FIG. 8 is an illustration of one embodiment of an example workflow 800 to predict a die heat map using the multiple trained die models (continued). In FIG. 8, workflow 800 includes decay curves 802A and 802B, where the values of the decay curves are scaled linearly with each given scaled source value for prediction in the power array to the maximum scaled power value used for training. At block 804, workflow 800 applies the decay curves to each of the tiles of the scaled die model. In addition, the workflow 800 uses linear supposition to calculate a total temperature rise for the sources of the scaled die model. In one embodiment, this calculation produces heatmap 1 (806A) and heatmap 2 (806B). At 808, the workflow 800 applies the associated correction map to each of heatmaps 1 (806A) and heatmap 2 (806B) to produce corrected heatmap 1 (810A) and corrected heatmap 2 (810B). Workflow 800 further performs a weighted interpolation (812) of corrected heatmap 1 (810A) and corrected heatmap 2 (810B) to produce the corrected heatmap 814. The workflow 800 further filters the corrected heatmap 814 to find the center tile temperature of the original source, power array, or map.

Figure 9:
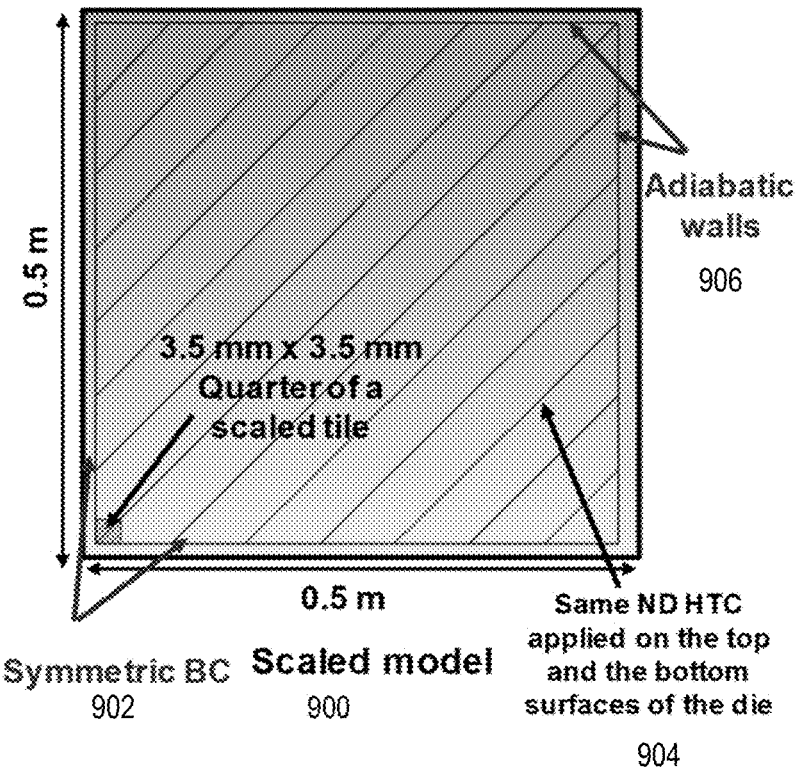
FIG. 9 is an illustration of one embodiment of a quarter of a scaled model of a die model with thermal boundary conditions.

FIG. 9 is an illustration of one embodiment of scaled die model 900. In one embodiment, the scaled die model 900 can be scaled up using one of the planar directions while the real-world thickness direction is fixed for the same chip technology. In addition, the die thickness, if not scaled correctly, can introduce significant errors (20-25%). Thus, in one embodiment, the scaled thickness is a function of die size in the horizontal plane. In this embodiment, five different die sizes (e.g., ranging between 4 and 30 mm) can be considered to reduce the impact of thickness scaling, while using interpolation. While in one embodiment, five die thicknesses are used, in alternate embodiment, more or less die thicknesses can be used. In this embodiment, a nondimensional die size is set to the maximum of the range (e.g., 30 mm) so that large scale tile array of N×N um (e.g., 210×210 um) cover the entire surface of the die. As a result, for this setup, a P×P (e.g., 143×143 based on the die and large-scale tile sizes) grid are used for training. In one embodiment, scaling is done not only for geometry but also the boundary condition inputs such as contact resistance, HTC, etc. In addition, decay curves from this training exercise are generated for the tile, which is at the die center, where this will be used for heat map prediction purposes.

In one embodiment, the model can be scaled up in a plane direction while the input physical thickness direction can be fixed for the same chip technology. For example, and in one embodiment, for different die sizes (e.g., 4 mm, 8 mm, 16 mm, 24 mm, 30 mm, or other die sizes), the same physical thickness can be used, but the scaled thickness can vary:

TABLE 1

| Scaled thickness versus die size. | | |
| --- | --- | --- |
| Die size (mm) | Physical thickness (mm) | Scaled thickness (mm) |
| 4 | 0.1 | 25 |
| 8 | 0.1 | 12.5 |
| 16 | 0.1 | 6.25 |
| 24 | 0.1 | 4.17 |
| 30 | 0.1 | 3.33 |

In FIG. 9, the scaled model 900 includes symmetric boundary conditions 902 and adiabatic walls 906. In addition, the same nondimensional HTC 904 is applied on the top and bottom of a quarter of the scaled model 900.

Figure 10:
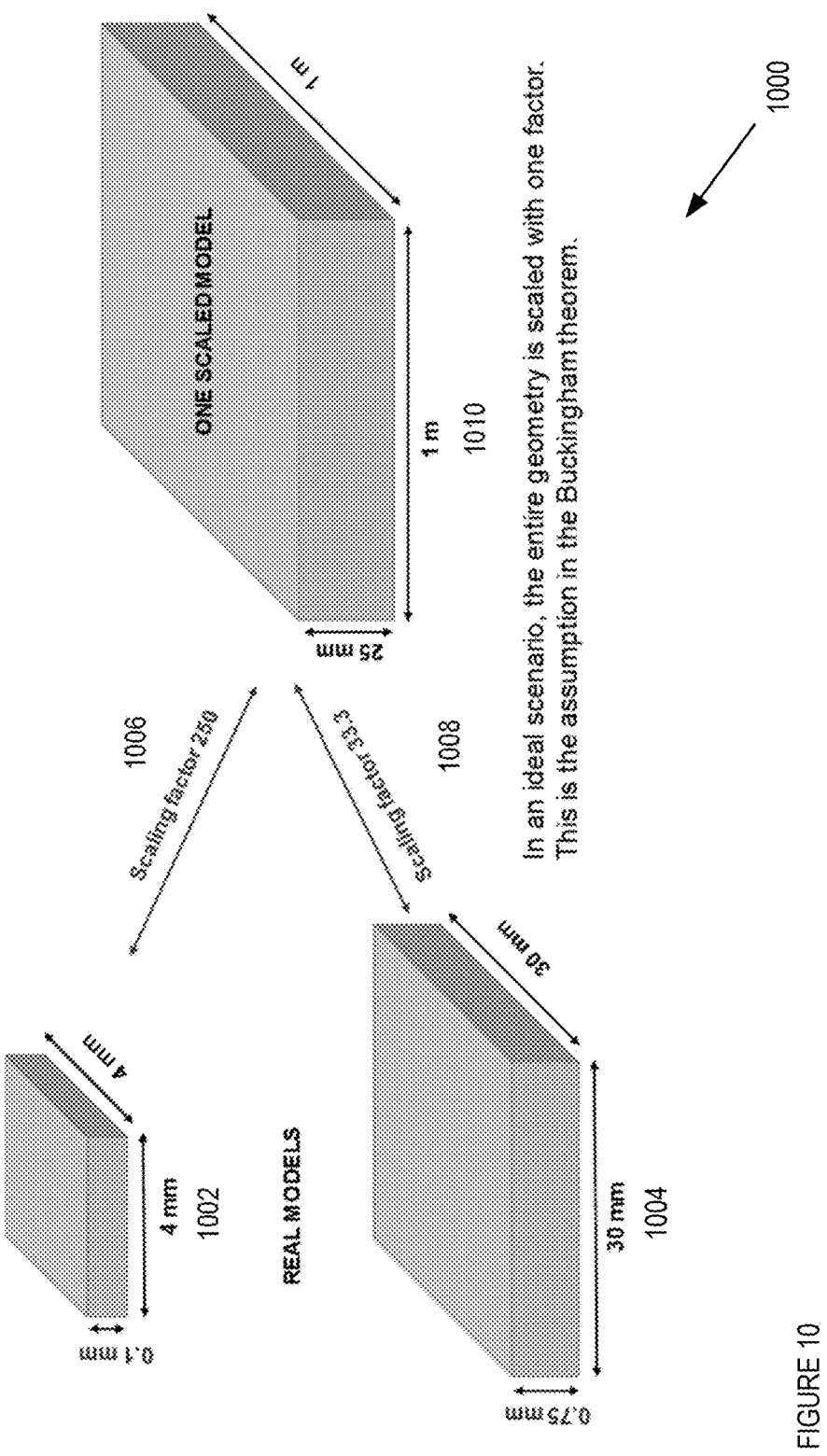
FIG. 10 is an illustration of one embodiment scaling a real-world die model to a scaled die model.

FIG. 10 is an illustration of one embodiment of scaling 1000 a real-world die model to a scaled die model. In FIG. 10, real-world die models 1002 and 1004 are scaled into a single scaled die model 1010. In one embodiment, the real-world die model 1002 with dimension of 4 mm in the planar dimension and a thickness of 0.1 mm is scaled using a scaling factor of 250 (1006) to the scaled die model 1010 dimensions of 1 m in the planar dimension and a thickness of 25 mm. Similarly, real-world die model 1004 with dimension of 30 mm in the planar dimension and a thickness of 0.75 mm is scaled using a scaling factor of 33.3 (1008) to the scaled die model 1010. In one embodiment, the entire geometry is scaled with one factor, which is an assumption of the Buckingham theorem.

Figure 11:
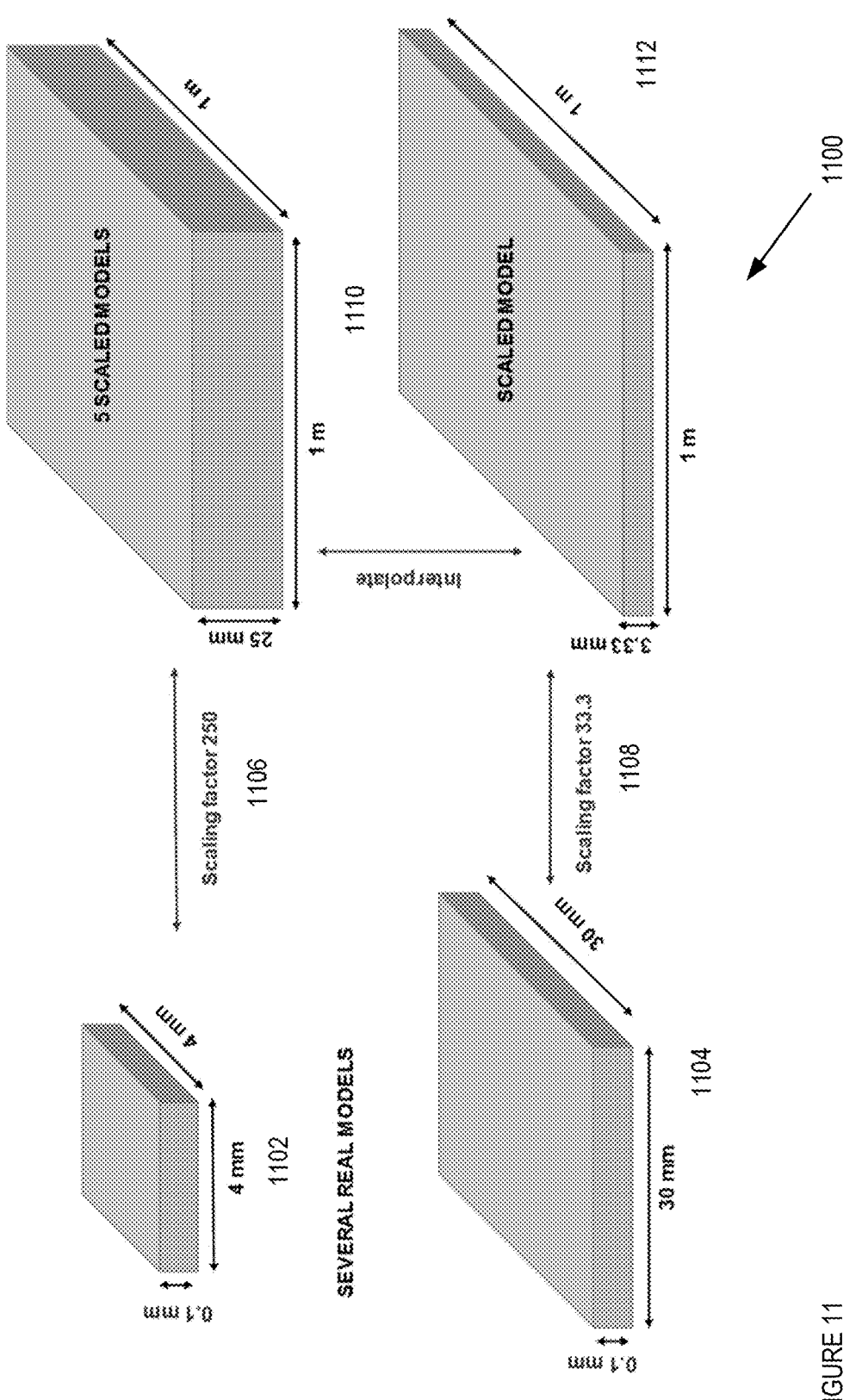
FIG. 11 is an illustration of one embodiment scaling a real-world die model to multiple scaled die models.

FIG. 11 is an illustration of one embodiment scaling a real-world die model 1100 to multiple scaled die models. In FIG. 11, there are several real-world die models, such as real-world die models 1102 and 1104, which are scaled into a number of different scaled models. In one embodiment, real-world die model 1102 is scaled using a scaling factor of 250 (1106) to a scaled die model 1110 with dimensions of 1 m in the planar dimension and 25 mm for a die thickness. In addition, real-world die model 1104 is scaled using a scaling factor of 33.3 (1108) to a scaled die model 1112 with dimensions of 1 m in the planar dimension and 3.33 mm for a die thickness.

FIG. 12 is an illustration of one embodiment of a lookup table 1200 comparing die size and scaled heat transfer coefficient (HTC). The Heat Transfer Coefficient used on the top and the bottom surfaces of the die is scaled for training using the die length as the scaling factor $h \rightarrow h_{ND}/L$.

In one embodiment, for improved accuracy, there are at least 5 points between the prescribed HTC range (e.g., 100 to 500 W/m²K) for each die size. In another embodiment, a wider range of scaled HTC can be used for training.

FIG. 13 is a block diagram illustrating a decay curve 1308 of a temperature drop versus distance for a scaled model. In FIG. 8, a quarter of a scaled model 1304 has dimensions 0.5 m×0.5 m. In addition, the scaled model 1304 is partitioned into smaller tiles 1302. For example, and in one embodiment, the scaled model 1304 is partitioned into 3.5 mm×3.5 mm tiles. In addition, FIG. 13 includes a sample decay curve of a temperature drop vs. distance from an active source. In one embodiment, the active source is a heat source.

In one embodiment, "Conduction Only" Physics is linear and conducive for Superposition. By leveraging Superposition, the training requirement for this setup reduces to one trial, as opposed to thousands or millions of trials. By limiting the number of sources to one, this improves the efficiency of the processing device computing the model because less computational resources are needed. In addition, and in one embodiment, only one source is being used.

It is triggered by the maximum surface flux (e.g., 3,000,000 W/m²-Scaled flux of e.g., 108 W/m² (10 mw per 10 um*10 um surface)). Thus, the resulting temperature rise at the tiles (e.g., 20449 source—array of 143 by 143) centers are captured and used for the training using Multi-Dimensional Interpolation algorithms. In this embodiment, there are two levels of interpolations for both, the HTC and the die thickness, among the trained models. In addition, the temperature rise for all the sources (corresponding to the triggering of each individual source) are calculated and summed up efficiently, without the need for a CFD trial for each source. As a result of this smart approach, the training effort is reduced significantly (from several weeks to a few hours).

In a further embodiment, with SSMR for far field metrics, a conformal meshing scheme is used (the quarter tile has mesh refinement set to 35×35 in the horizontal plane). Any other CFD cell number can be used if results are mesh independent. In addition, equivalent of meshing each large-scale tile of P×P (e.g., 210 um×210 um) size with a mesh refinement setting (e.g., 70×70) in the horizontal plane (3 um×3 um face elements). Furthermore, scaled HTC values selected bases on application to cover the entire range for training—here 0.4, 0.75, 1, 1.5, 2, 3, 4, 6, 8, 12, 15 are used but any other scaled value can be selected to cover the range needed per application. For each HTC, the single source is trained only with the maximum scaled power. In addition, by making use of the symmetry in the setup and removing the redundancies, it is possible to use a power value and the same can be scaled for predictions. Training data (decay curves) for each set of scaled HTC and thickness was generated.

Figure 14:
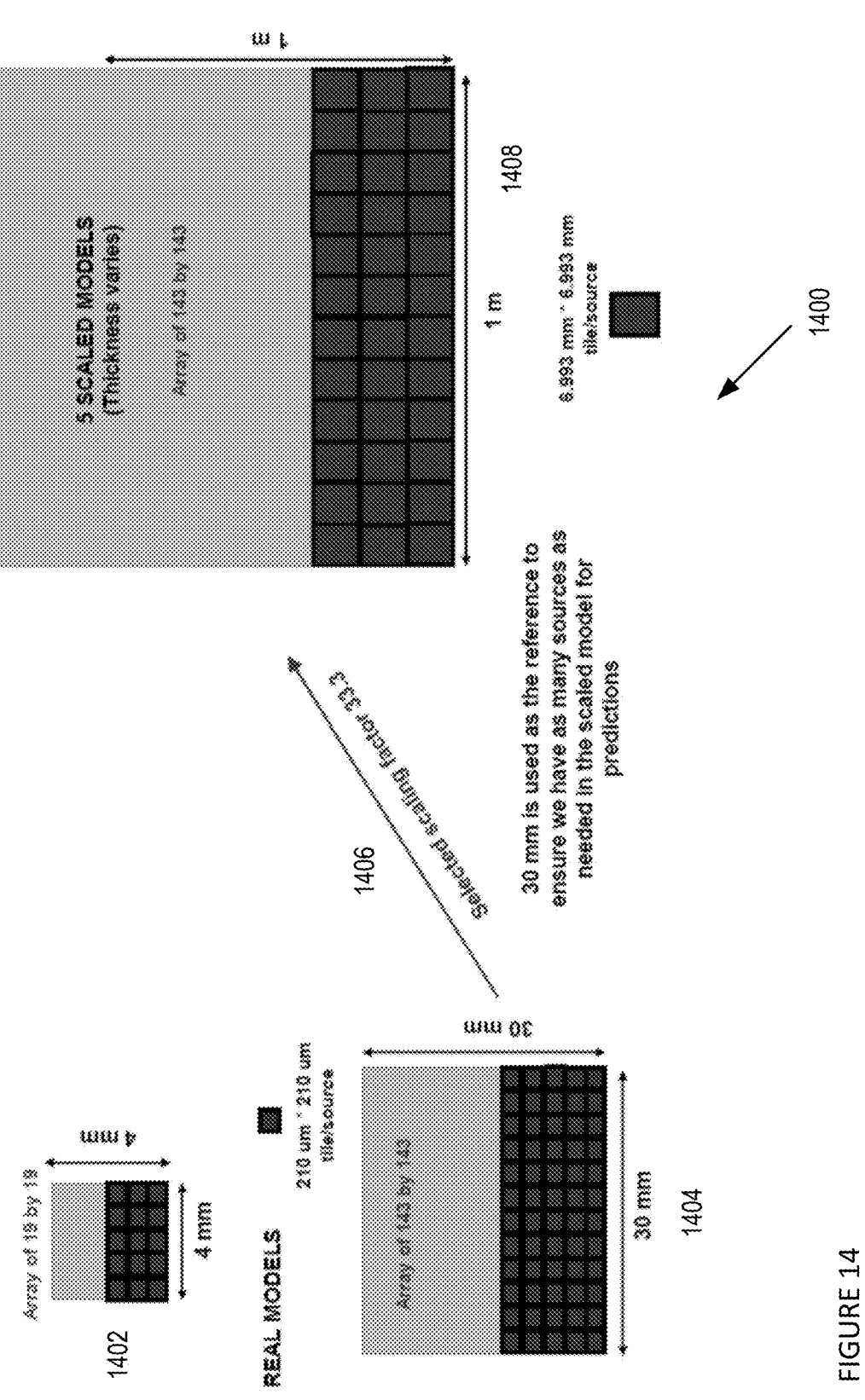
FIG. 14 is an illustration of one embodiment of scaling a real-world model for training.

FIG. 14 is an illustration of one embodiment of scaling a real-world model for training. In FIG. 14, two real-world die models are illustrated (1402 and 1404). The real-world die model 1402 has planar dimensions of 4 mm with an array of tiles/sources of 19×19 grid, where the tiles size was 210 um×210 μm. In addition, the real-world die model 1404 has planar dimensions of 30 mm with an array of tiles/sources of 143×143 grid, also with the tiles size of 210 um×210 um. These real-world die models 1402 or 1404 are scaled (1406) to one of the five scaled die modes 1408, where the die thickness of the scaled die models 1408 varies. In one embodiment, each of the scaled die models 1408 have the same planar dimension (e.g., 1 m). The scaled die models 1408 further include an array of 143×143 with each tile/source having a dimension of 6.993 mm×6.993 mm. In this embodiment, 30 mm is used as a reference so that can have as many sources as needed for the scaled model for the predictions.

Figure 15:
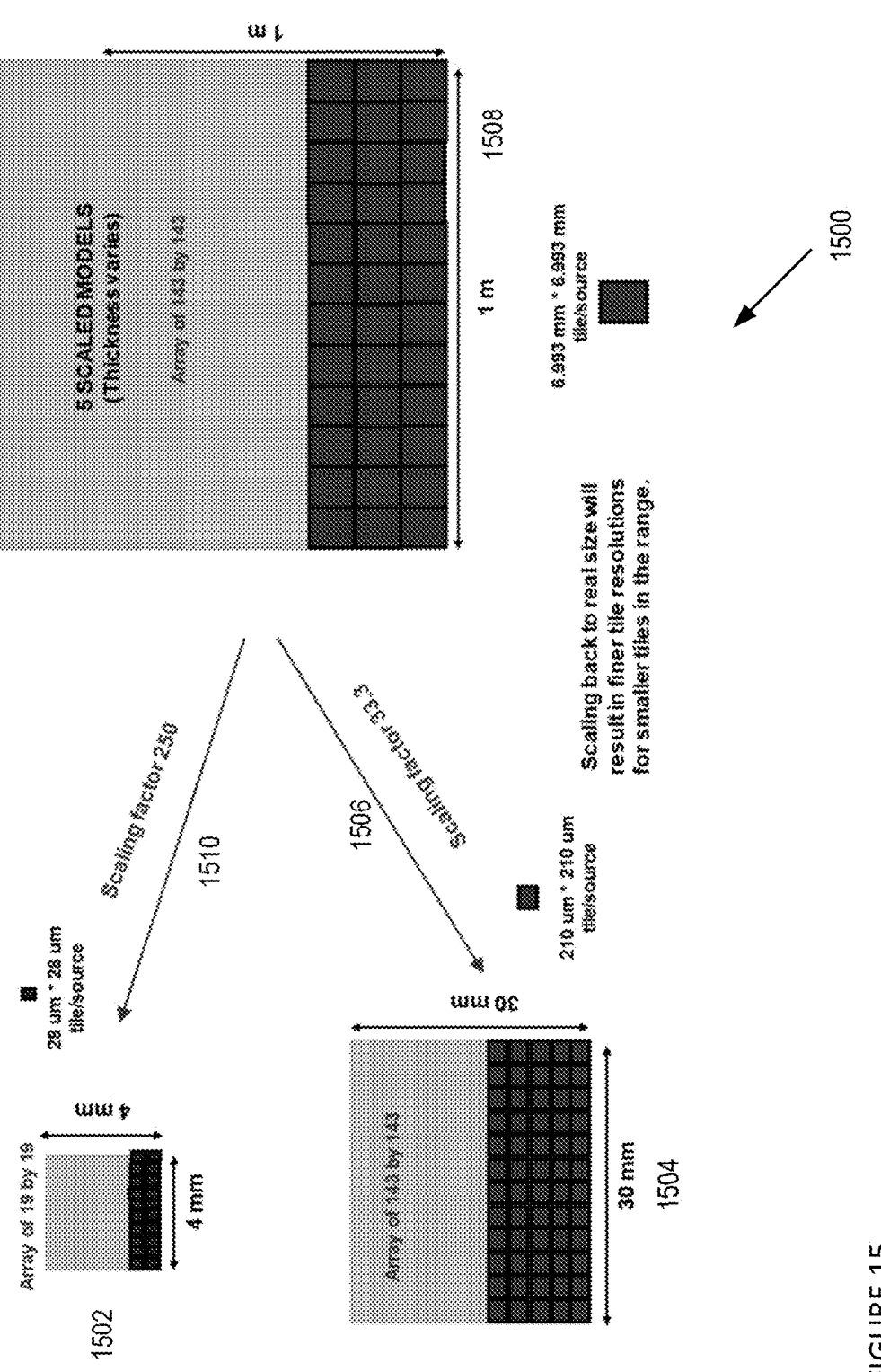
FIG. 15 is an illustration of one embodiment of scaling back for real size for predictions.

FIG. 15 is an illustration of one embodiment of scaling back for real size for predictions. In FIG. 15, the die scaled models 1508 are scaled back to the real-world die models (1502 or 1504). In one embodiment, the scaled die models 1508 have the same planar dimension (e.g., 1 m). The scaled die models 1508 further include an array of 143×143 with each tile/source having a dimension of 6.993 mm×6.993 mm. In this embodiment, one or more of the scaled die models can be scaled back to a real-world die model using a scaling factor. For example, and in one embodiment, one of the five scaled die models 1508 can be scaled back to a 4 mm×4 mm real-world die model 1502 using a scaling factor of 250 (1510). In this embodiment, the real-world die model 1504 has 210 um×210 um sized tile or source. Alternatively, one of the five scaled die models 1508 can be scaled back to a 30 mm×30 mm real-world die model 1504 using a scaling factor of 33.3 (1506). In this embodiment, the real-world die model 1502 has 210 um×210 um sized tile or source.

Figure 16:
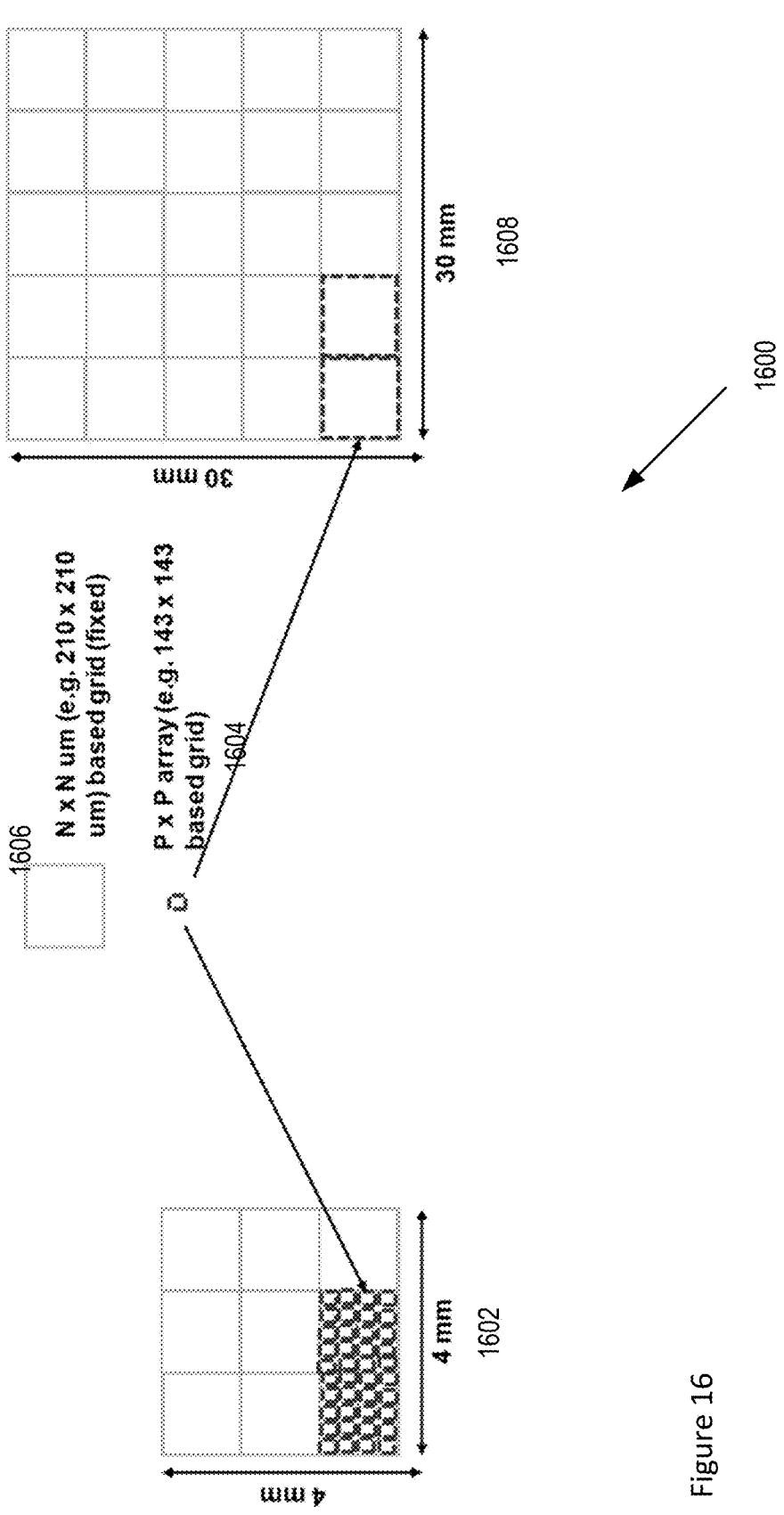
FIG. 16 is a block diagram illustrating a power grid.

FIG. 16 is a block diagram illustrating a power grid re-mapping 1600. In FIG. 16, the power grid re-mapping 1600 includes a grid 1602 of 4 mm×4 mm that includes a grid with larger grid tiles 1606 of N um×Num (e.g., 210 um×210 um) that each are partitioned into a P×P array (e.g., 143×143 based grid) 1604. In one embodiment, for any die size, a large-scale tile array of N×N um (e.g., 210×210 um) suffices to mask the die. For example, P×P array (e.g., 143×143) configuration for a 30 mm die is a bit too refined for the smaller die sizes. For instance, for a 4 mm die, only a 116×116 distribution of N×N um (e.g., 210×210 um) sources will suffice. The P×P (e.g., 143×143) array distribution will result in the use of smaller sources (way too small-7 um in this example for a 4 mm die). A power re-mapping scheme has been developed to automatically and efficiently distribute the input power to a larger array of P×P (e.g., 143×143) (coarse grid to fine gird conversion).

Figure 17:
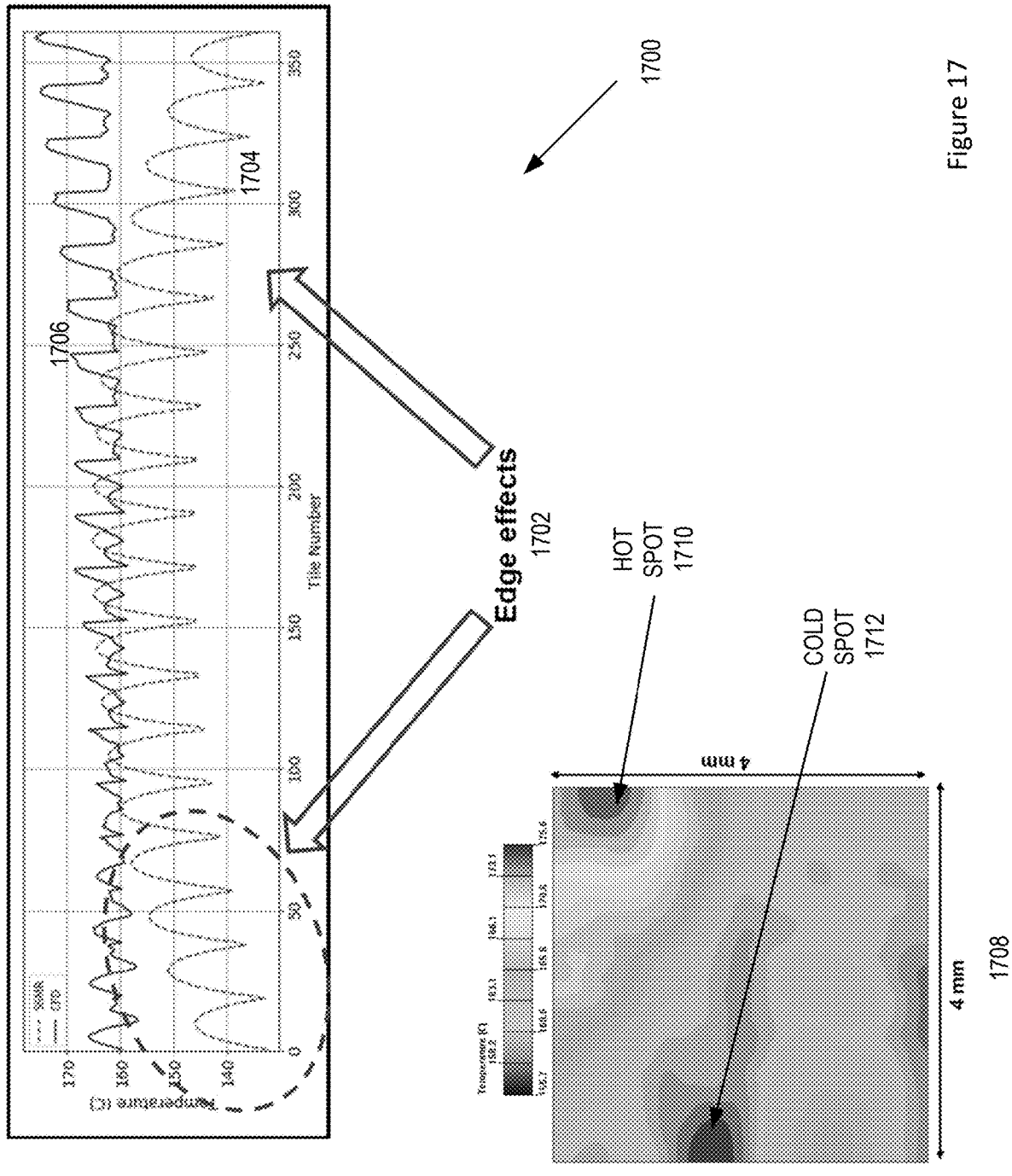
FIG. 17 is an illustration of one embodiment of an edge effects curve.

FIG. 17 is an illustration of one embodiment of an edge effects curve 1700. In one embodiment, there can be an edge effect in the model. In this embodiment, the edge can cause the temperature to be cooler in the model than what is should be as compared with a CFD model. For example, and in one embodiment, using the center tile decay curve, the Temperature rise for side and edge tiles was observed to be under-predicted in comparison to the CFD results. In one embodiment, the "edge effect" is a function of the candidate tile's location with respect to the walls, the die size, and the HTC. In this example, the temperature drops for the SSMR model 1704 for tile numbers near the edge as opposed to the CFP model. In addition, the heat map 1708 illustrates a cool heat map with a cold spot 1710, except for hot spots 1708 in the upper right-hand corner of the heat map 1700.

Figure 18:
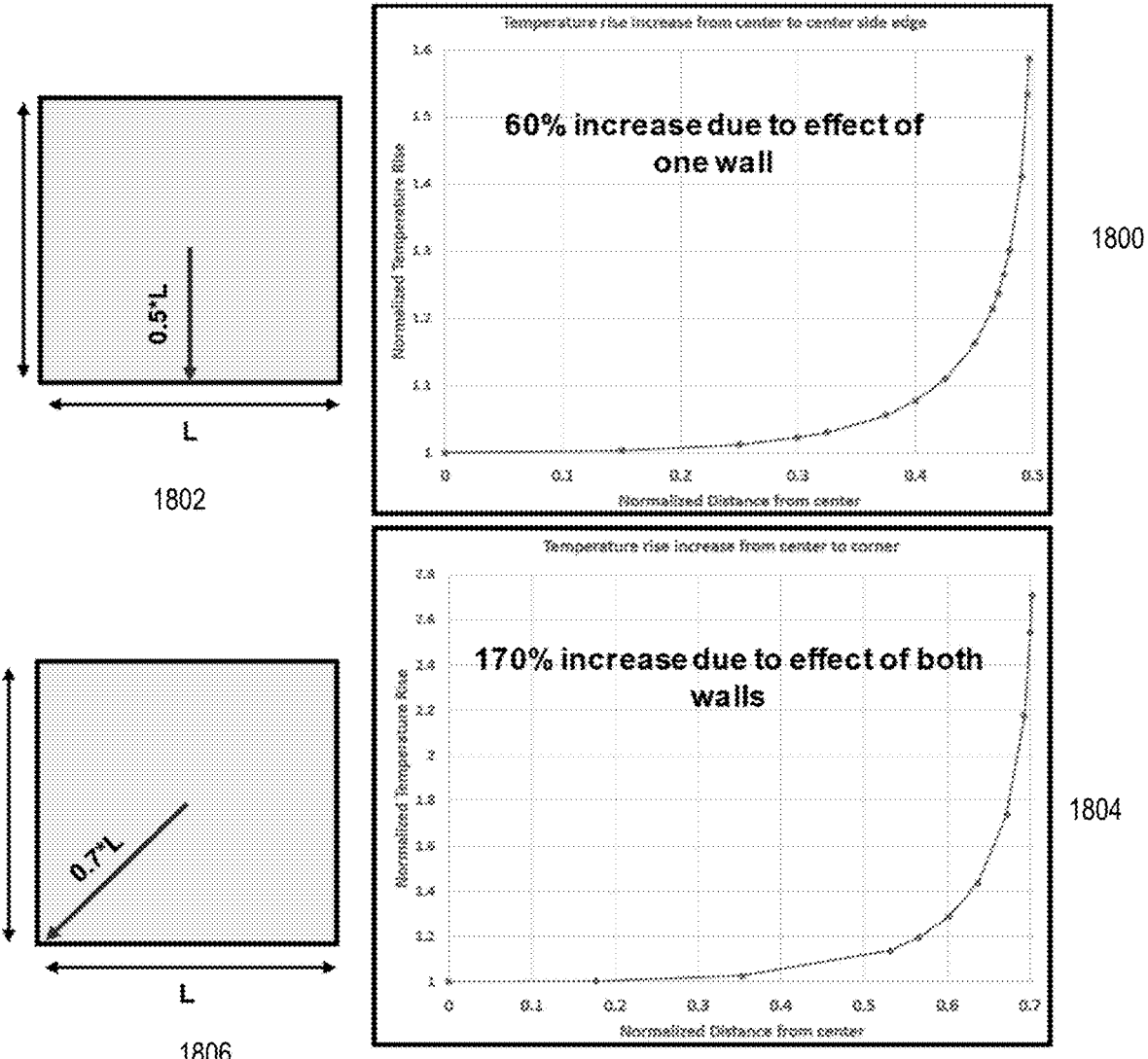
FIG. 18 is an illustration of one embodiment of temperature increases due to edge effects.

FIG. 18 is an illustration of one embodiment of temperature increases due to edge effects. In FIG. 18, two curves (1800 and 1804) are plotted. Curve 1800 illustrates a 60% increase due to effect of one wall (e.g., a temperature rise increases from center of the die to center side edge of the die). In one embodiment, the normalized temperature rise is plotted versus a normalized distance from center. In a further embodiment, in curve 1804, the temperature rise is larger due the effect of both walls (e.g., 170% increase of a normalized temperature rise versus a normalized distance from the center of the die). In one embodiment, this example was done on a selected die size (30 mm) and HTC (266 W/m²K). In this embodiment, one tile with the same power flux was moved across the top surface to measure the temperature rise.

Figure 19:
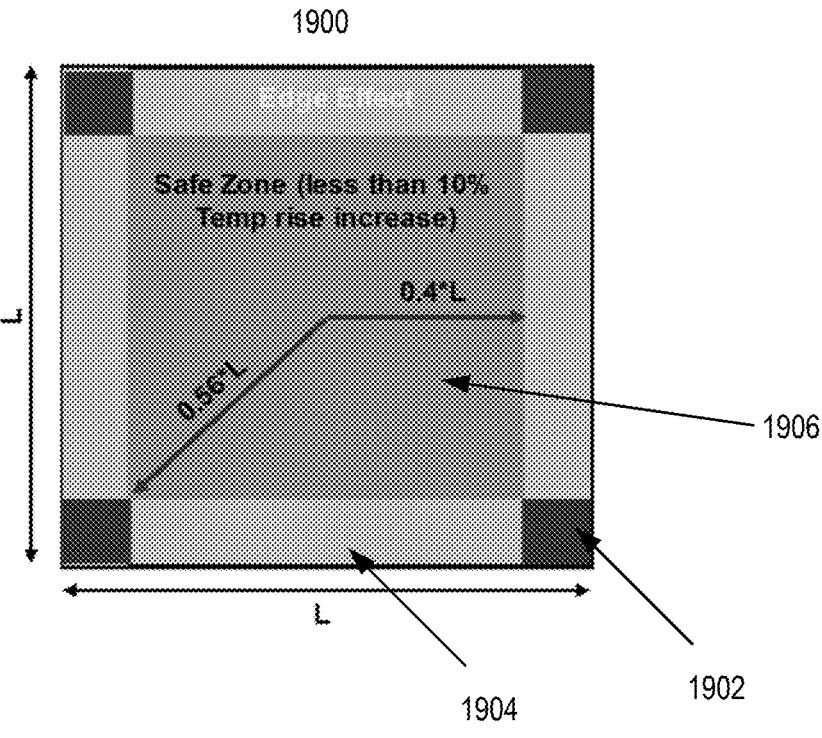
FIG. 19 is an illustration of one embodiment of a safe zone for die model.

FIG. 19 is an illustration of one embodiment of a safe zone for die model 1900. In one embodiment, the die model 1900 has dimensions of L×L and includes a safe zone 1906 that has a less than a ten percent temperature rise for each of the tiles in the safe zone 1906. In one embodiment, the safe zone 1906 is within 0.4*L from the center of the die model 1900 to a size edge and within 0.56*L from the center of the die model 1900 to a corner of the safe zone. In addition, the sides 1904 and corners 1902 of the die model 1900 has edge effects, which are outside of the safe zone 1906.

FIG. 20 is a flow diagram of one embodiment of a process 2000 to determine edge effect correction for a die model. In FIG. 20, process 2000 begins by applying a power flux to the die model at block 2002. In one embodiment, if the same power flux is assigned to each of the tiles of the die model, the temperature rise should be equal for those tiles. If the temperature is different than the predicted temperature rise, this change in the temperature rise can be used for an edge effect correction. For example, and in one embodiment, process 2000 applies the same maximum power flux to the tiles and the prediction trials for each set of scaled HTC and thickness were completed (55 predictions for all large-scale array of P×P tiles (e.g., 143 by 143)). At block 2004, process 2000 sets the center tile as a reference. In one embodiment, the "center tile" temperature rise was taken as a reference. In this embodiment, the assumption is that the center tile correction factor is 1.0 (no need for correction as the decay curve was extracted for this tile location).

Process 2000 sets the scaling for the other tiles at block 2006. In one embodiment, the predictions for all other tiles were scaled based on the center tile temperature rise (e.g., because the temperature rises are less than 1 due to the edge effects). In this embodiment, the inverse of the scaled temperature rise prediction for each tile was taken as the "correction factor." At block 2008, the correction factors are stored and used for the predictions with unseen scenarios.

In one embodiment, the SSMR approach is more efficient that a corresponding CFD computation. For the CFD training trials, the large-scale tiles of N×N um (e.g., 210×210 um) was meshed with a 3 micron resolution (70×70 mesh refinement in the horizontal plane for one full tile), with the growth cell ratio. The computational effort required for CFD trials with this level of mesh refinement will take a significantly larger (orders of magnitude larger) computational effort, making the CFD based approach impractical from the scalability and speed perspectives.

TABLE 2

| SSMR Computation Times | |
| --- | --- |
| | SSMR (all tile centers) - Single Core |
| Computational time for training | ~500 minutes (single core, concurrency) |
| Model Training Trials | 20 ms |
| Total time per heat map prediction (4 mm) | 1 min 44 sec |
| Total time per heat map prediction (12 mm) | 2 min 33 sec |
| Total time per heat map prediction (16 mm) | 3 min 5 sec |
| Total time per heat map prediction (28 mm) | 5 min 53 sec |
| Total time per heat map prediction (30 mm) | 6 min 32 sec |

Figure 21:
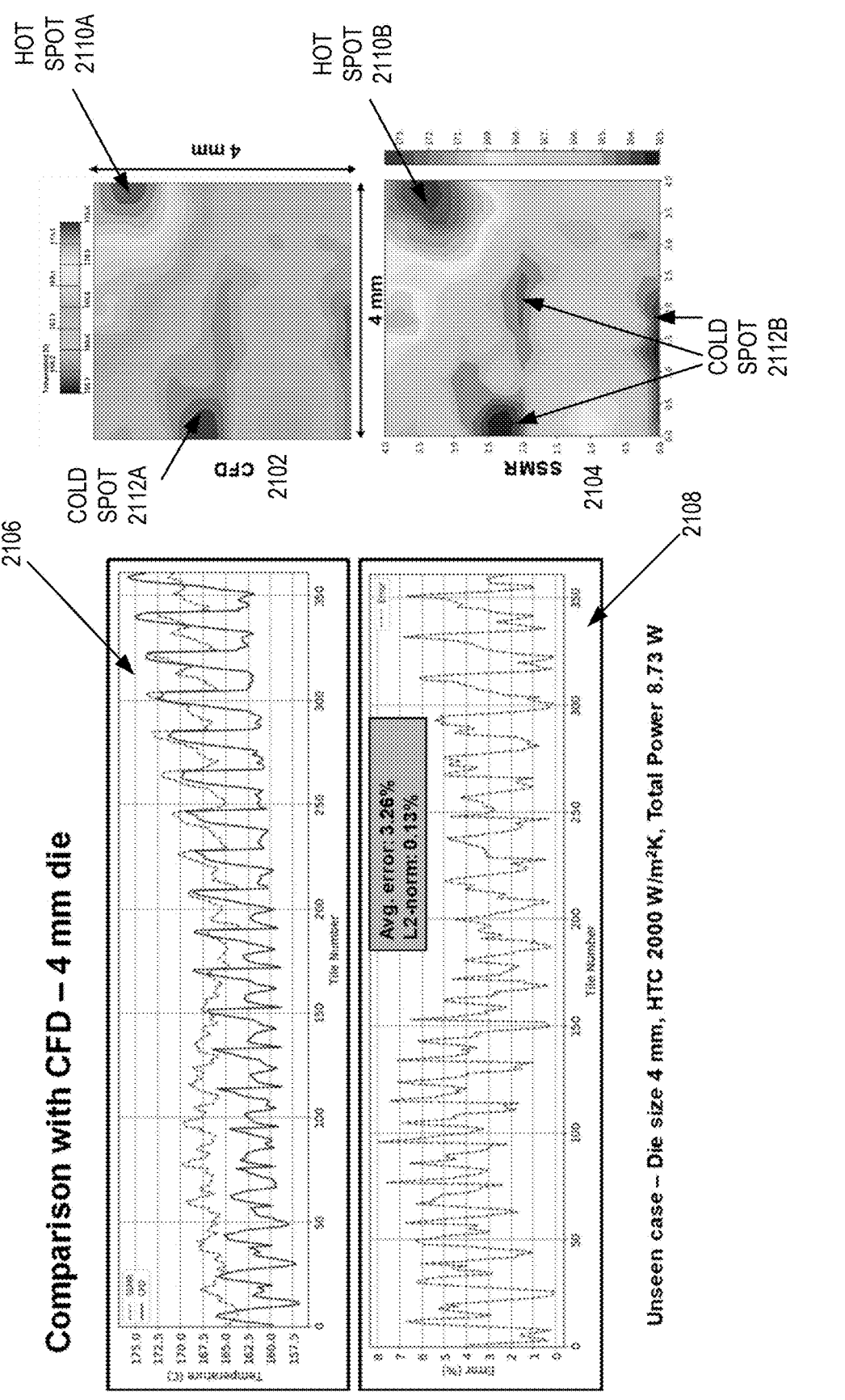
FIG. 21 is an illustration of one embodiment of a comparison of a predicted heat map with a heat map generated by Computational Fluid Dynamics (CFD) (4 mm die).

FIG. 21 is an illustration of one embodiment of a comparison of a predicted heat map with a heat map generated by CFD (4 mm die). In FIG. 21, a SSMR heat map 2104 is compared with a CFD heat map 2102. In one embodiment, an error for the SSMR heat map is computed using the CFD heat map 2102 as the standard, where the error is computed over the tile number of the heat map. In this embodiment, the SSMR heat map 2104 follows the CFD heat map 2102 with an average error of 3.26% and an L2 norm of 0.13%. A plot 2106 of comparing the CFD and SSMR temperatures shows the SSMR results closely follow the CFD results, where the hot spot for SSMR (2110B) is close in location and size to the hot spot (2110A) from CFD The SSMR shows some additional cold spots (2112B) than in the CFD heat map (2112A). In one embodiment, the results shown in FIG. 21 are for a die size of 4 mm, HTC of 2000 W/m²K, and total power 8.73 W.

Figure 22:
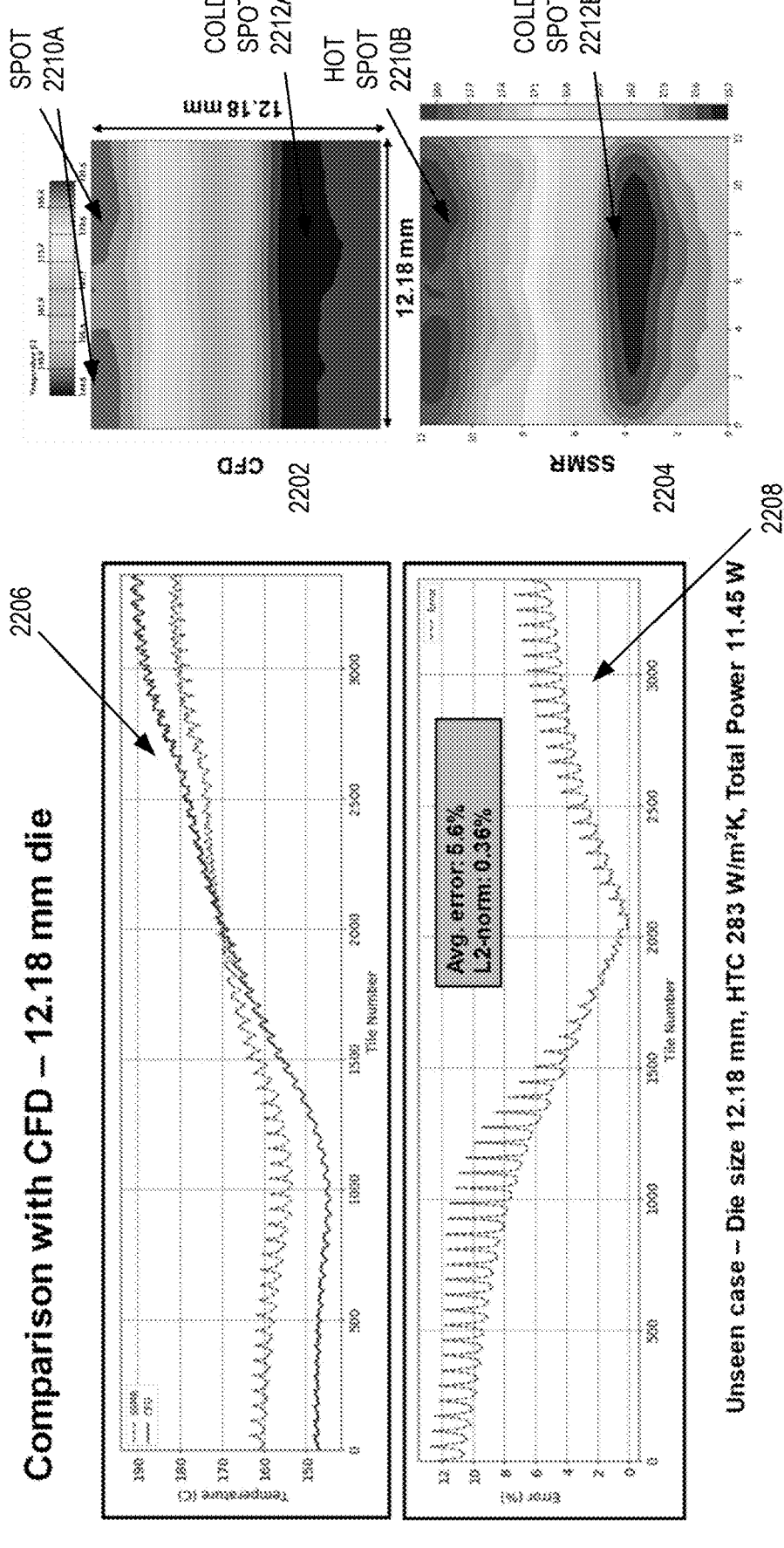
FIG. 22 is an illustration of one embodiment of a comparison of a predicted heat map with a heat map generated by CFD (12.18 mm die).

FIG. 22 is an illustration of one embodiment of a comparison of a predicted heat map with a heat map generated by CFD (12.18 mm die). In FIG. 22, a SSMR heat map 2204 is compared with a CFD heat map 2202. In one embodiment, an error for the SSMR heat map is computed using the CFD heat map 2202 as the standard, where the error is computed over the tile number of the heat map. In this embodiment, the SSMR heat map 2204 follows the CFD heat map 2202 with an average error of 5.6% and an L2 norm of 0.36%. A plot 2206 of comparing the CFD and SSMR temperatures shows the SSMR results closely follow the CFD results, where the hot spot for SSMR (2210B) is close in location and size to the hot spot (2210A) from CFD The SSMR shows a smaller cold spot (2212B) than in the CFD heat map (2212A). In one embodiment, the results shown in FIG. 22 are for a die size of 12.18 mm, HTC 283 W/m²K, and Total Power 11.45 W.

Figure 23:
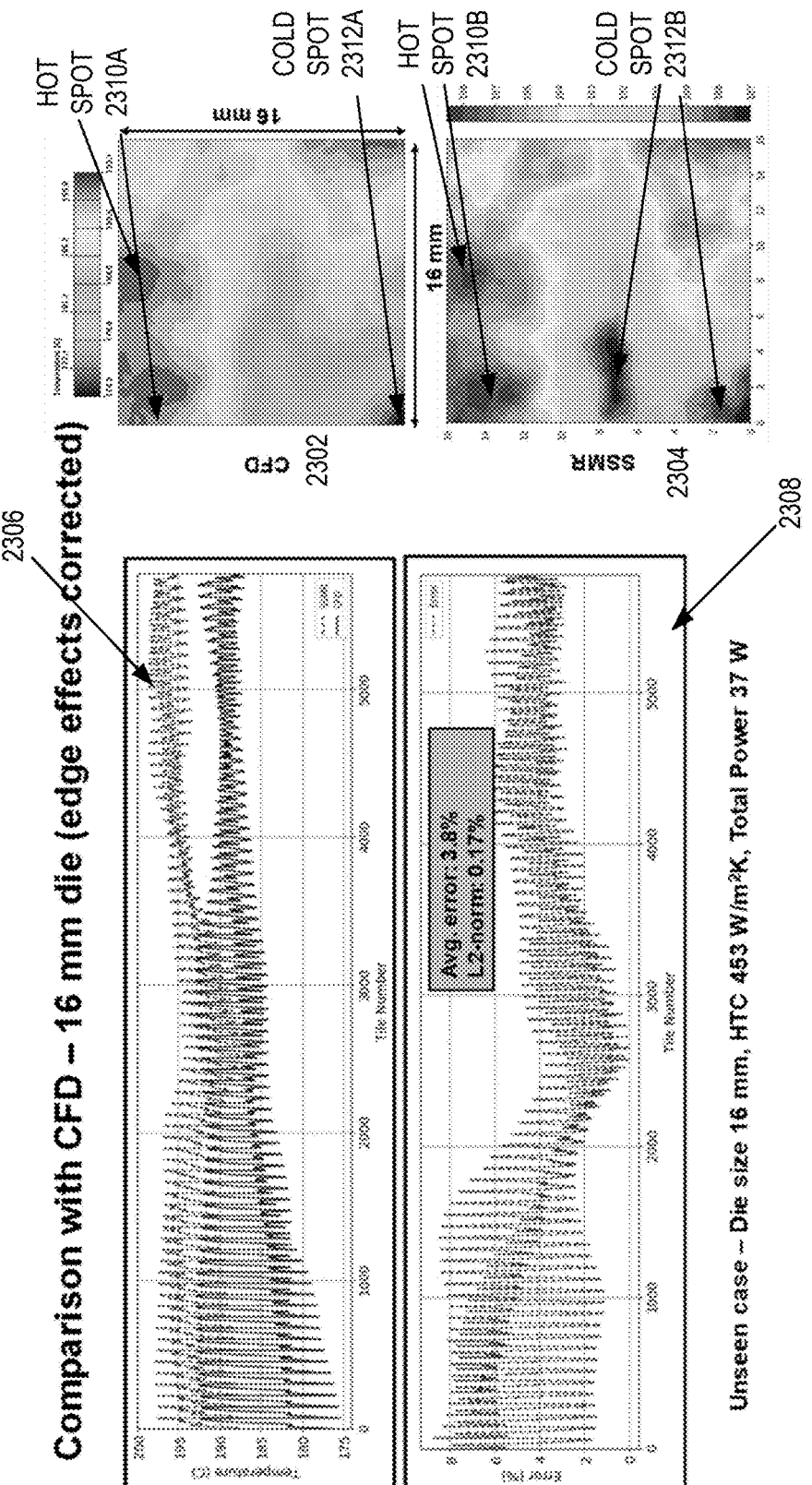
FIG. 23 is an illustration of one embodiment of a comparison of a predicted heat map with a heat map generated by CFD (16 mm die).

FIG. 23 is an illustration of one embodiment of a comparison of a predicted heat map with a heat map generated by CFD (16 mm die). In FIG. 23, a SSMR heat map 2304 is compared with a CFD heat map 2302. In one embodiment, an error for the SSMR heat map is computed using the CFD heat map 2302 as the standard, where the error is computed over the tile number of the heat map. In this embodiment, the SSMR heat map 2304 follows the CFD heat map 2302 with an average error of 3.8% and an L2 norm of 0.17%. A plot 2306 of comparing the CFD and SSMR temperatures shows the SSMR results closely follow the CFD results, where the hot spot for SSMR (2310B) is close in location and size to the hot spot (2310A) from CFD. The SSMR shows additional cold spots (2312B) than in the CFD heat map (2312A). In one embodiment, the results shown in FIG. 23 are for a die size of 16 mm, HTC 453 W/m²K, and Total Power 37 W.

Figure 24:
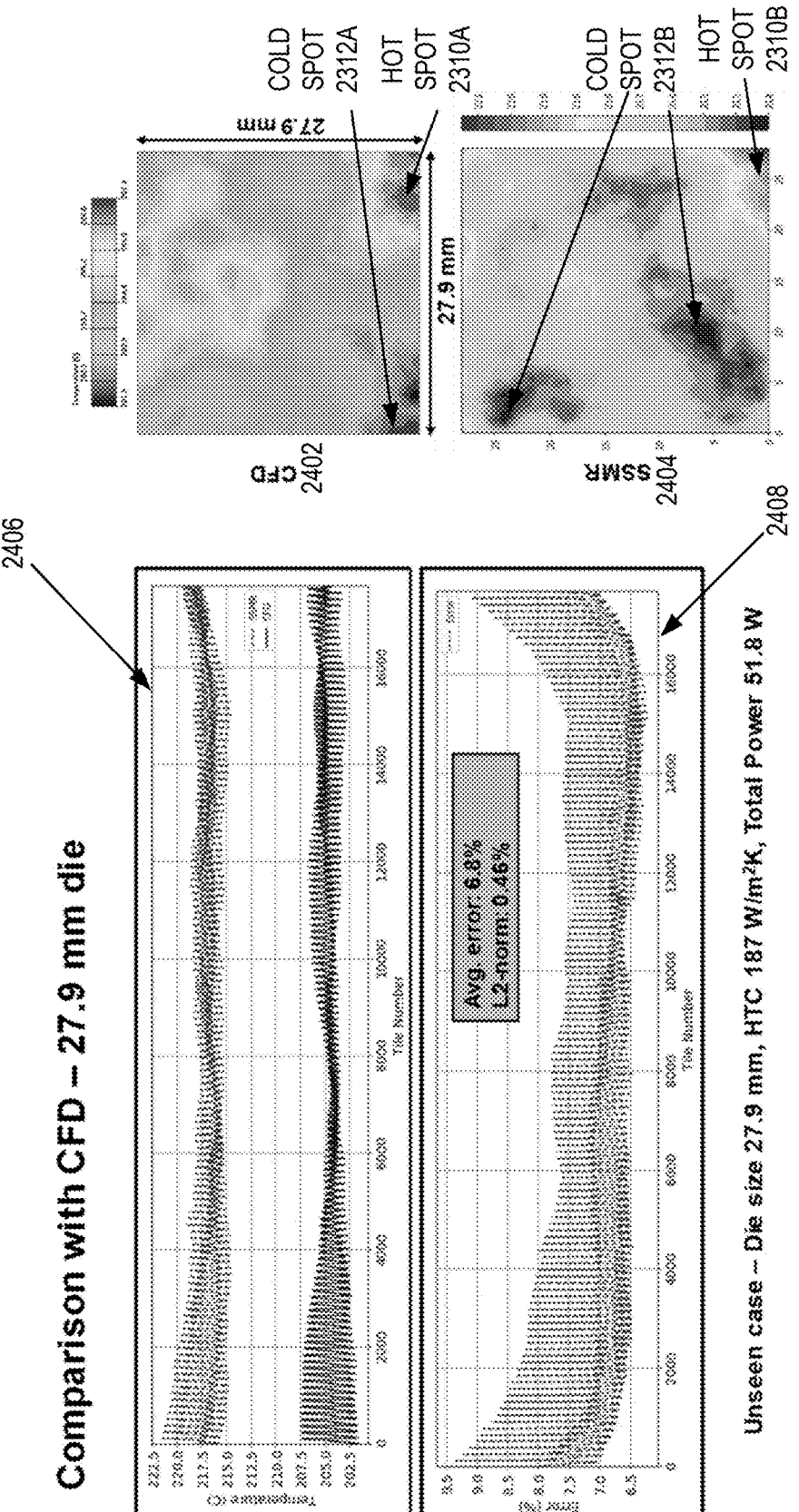
FIG. 24 is an illustration of one embodiment of a comparison of a predicted heat map with a heat map generated by CFD (27.9 mm die).

FIG. 24 is an illustration of one embodiment of a comparison of a predicted heat map with a heat map generated by CFD (27.9 mm die). In FIG. 24, a SSMR heat map 2404 is compared with a CFD heat map 2402. In one embodiment, an error for the SSMR heat map is computed using the CFD heat map 2402 as the standard, where the error is computed over the tile number of the heat map. In this embodiment, the SSMR heat map 2404 follows the CFD heat map 2402 with an average error of 6.8% and an L2 norm of 0.46%, although this error is slightly larger than in FIGS. 14 and 24. A plot 2406 of comparing the CFD and SSMR temperatures shows the SSMR results closely follow the CFD results, where the hot spot for SSMR (2310B) is close in location and size to the hot spot (2310A) from CFD. The SSMR shows additional cold spots (2312B) than in the CFD heat map (2312A). In one embodiment, the results shown in FIG. 24 are for a die size of 27.9 mm, HTC 187 W/m²K, Total Power 51.8 W.

FIG. 25 is an illustration of one embodiment of a stacked die 2500 with multiple heat sources. In FIG. 25, the stacked 2500 includes stacked dies 2502 and a single die 2508 that each include multiple heat sources 2504. In one embodiment, the SSMR modeling approach can be used for both the single die 2508 and stacked dies 2502 alone or in a stacked dies and single die structure 2506.

Figure 26:
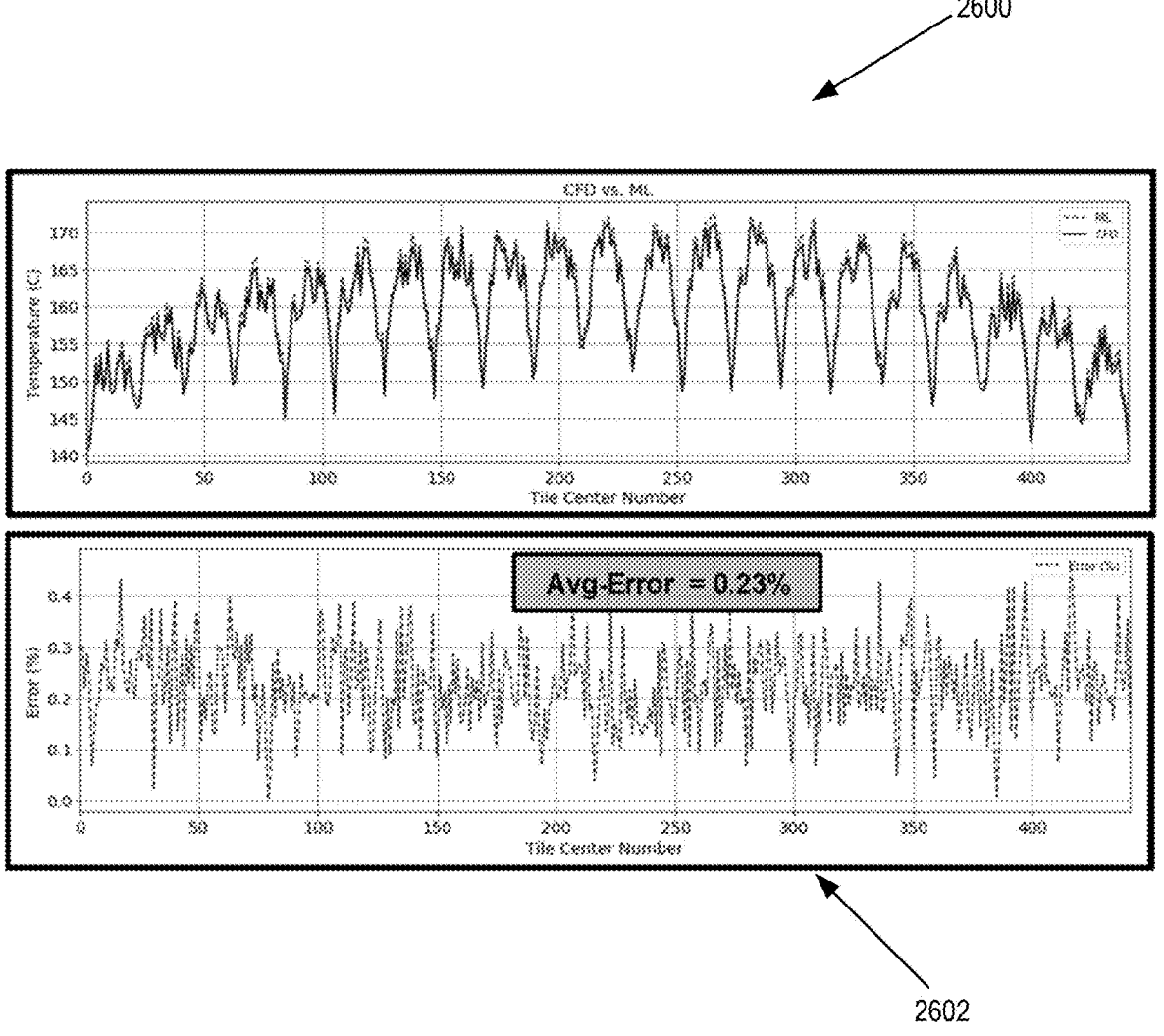
FIG. 26 is an illustration of one embodiment of a comparison of a predicted heat map with a heat map generated by CFD after applying SVDML.

FIG. 26 is an illustration of one embodiment of a comparison 2600 of a predicted heat map with a heat map generated by CFD after applying SVDML. In FIG. 26, the comparison 2600 compares the temperature as computed by CFD versus the temperature computed by applying SVDML to a SSMR heat map. As illustrated in FIG. 26, the average error is reduced to 0.23%. In one embodiment, The SVDML technique can be employed to accurately capture the localized hot spots within the N×N um (e.g., 210×210 um) sources, with the high Temperature information predicted by SSMR at the larger scale. In this embodiment, The SVDML method offers fast and accurate prediction of steady state linear & non-linear physics. For example, and in one embodiment, small scale tiles of M×M um (e.g., 10×10 um) with a power range (e.g., 0 to 10 mW) (near field modeling)

can be applied to each tile of the large-scale tiles. Each source size of M×M um (e.g., 10×10 um) has 10×10 CFD cells in (1 um resolution or smaller) for mesh independent results. Furthermore, power resolution for localized predictions can be any number (21×21 array of 10 um×10 um sources (total 441 sources). In this example, 1326 trials 3*(S+1) in total (DOE-optimal space filling) and (S+1) trials for each set of HTCs, where 3 HTCs used, and S is the total number of sources. In addition, the comparison 2600 was for 441 center temperatures. In one embodiment, SVDML is further described in U.S. patent application Ser. No. 17/392, 350, entitled "SYSTEMS AND METHODS FOR HIGH-SPEED SIMULATION OF A PHYSICAL SYSTEM", filed on Aug. 3, 2021. In a further embodiment, the SVDML method is an economical one, where computations times for a SVDML training process for a die center is 197 ms and a SVDML prediction for a die center is 6 ms. This in comparison, where each CFD trial is 41 seconds.

Figure 27:
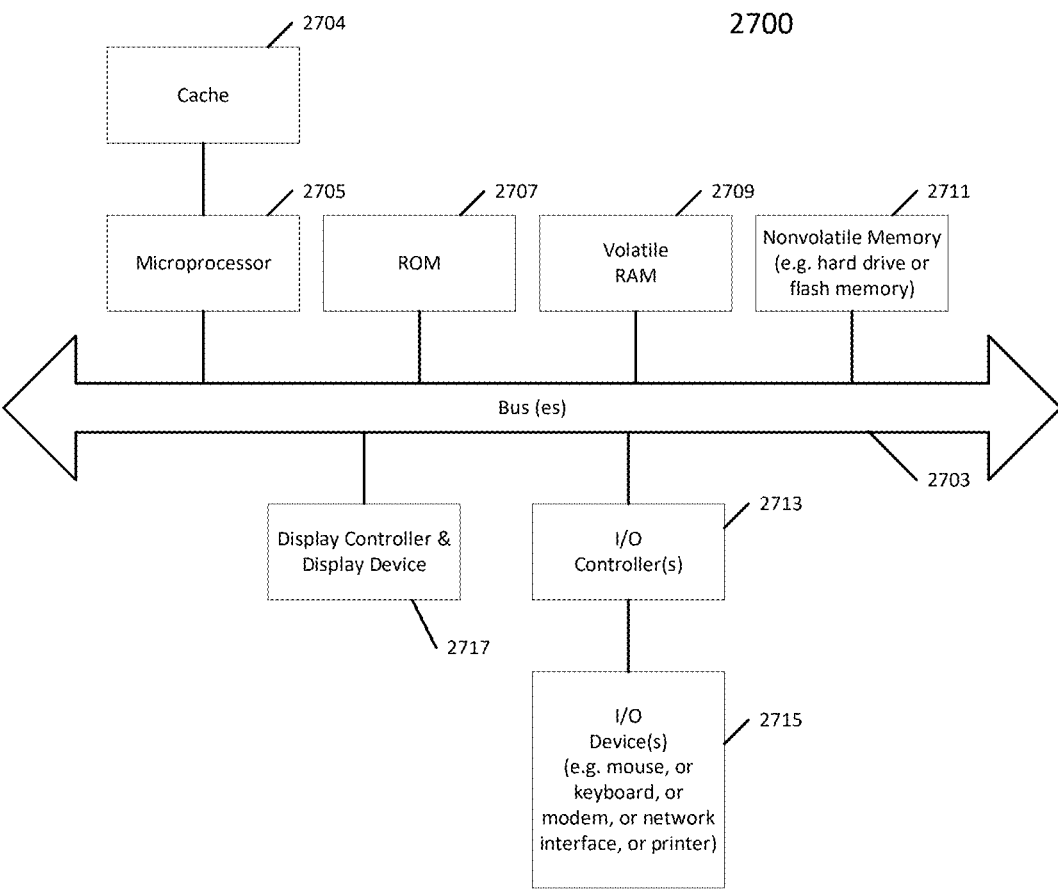
FIG. 27 illustrates one example of a typical computer system, which may be used in conjunction with the embodiments described herein.

FIG. 27 shows one example of a data processing system 2700, which may be used with one embodiment of the present invention. For example, the system 2700 may be implemented as a system that includes a model processing device 102 as shown in FIG. 1 above. Note that while FIG. 27 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 27, the computer system 2700, which is a form of a data processing system, includes a bus 2703 which is coupled to a microprocessor(s) 2705 and a ROM (Read Only Memory) 2707 and volatile RAM 2709 and a non-volatile memory 2711. The microprocessor 2705 may include one or more CPU(s), GPU(s), a specialized processor, and/or a combination thereof. The microprocessor 2705 may retrieve the instructions from the memories 2707, 2709, 2711 and execute the instructions to perform operations described above. The bus 2703 interconnects these various components together and also interconnects these components 2705, 2708, 2709, and 2711 to a display controller and display device 2717 and to peripheral devices such as input/output (I/O) devices which may be mice, keyboards, modems, network interfaces, printers and other devices which are well known in the art. Typically, the input/output devices 2715 are coupled to the system through input/output controllers 2713. The volatile RAM (Random Access Memory) 2708 is typically implemented as dynamic RAM (DRAM), which requires power continually in order to refresh or maintain the data in the memory.

The mass storage 2711 is typically a magnetic hard drive or a magnetic optical drive or an optical drive or a DVD RAM or a flash memory or other types of memory systems, which maintain data (e.g., large amounts of data) even after power is removed from the system. Typically, the mass storage 2711 will also be a random-access memory although this is not required. While FIG. 8 shows that the mass storage 2711 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus

2703 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus, processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The present invention also relates to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMS, EEPROMs, magnetic or optical cards, or any type of media suitable for storing electronic instructions, and each coupled to a computer system bus.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "training," "predicting," "scaling," "mapping," "re-mapping," "correcting," "computing," "augmenting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A method of generating a die heat map for a die, the method comprising:
   receiving a die model for representing the die and a boundary condition applicable to the die, the die model including dimensions of the die;
   scaling the dimensions of the die model and the boundary condition, wherein the dimensions of the die model is scaled to a target die size, the scaled dimensions including a scaled die thickness;
   selecting one or more trained die models from a plurality of trained die models using the scaled die thickness, wherein each trained die model including a die surface of the target die size, different trained die models having different die thickness, the plurality of trained die models trained under a plurality of boundary conditions, each trained die model having a plurality of decay curves associated with the plurality of boundary conditions;
   determining a relationship between the scaled boundary condition and the plurality of boundary conditions;
   determining a decay curve for the die model according to a combination of decay curves associated with the plurality of boundary conditions for the one or more trained die models using the relationship; and
   generating the die heat map based on the decay curve determined for the die model.

2. The method of claim 1, wherein each decay curve represents a temperature change versus a distance from a triggered source in a die represented by the die heat map.

3. The method of claim 1, wherein the die model further includes an ambient temperature.

4. The method of claim 1, wherein the selecting of the one or more trained die models:
   selecting the one or more trained die models from a plurality of trained models where the one or more trained die models have a die thickness that is closet in value to the scaled die thickness.

5. That method of claim 1, wherein scaling the dimensions of the die model to the target die size comprises:
   determining a longest dimension from the dimensions of die model, wherein the longest dimension is one of length and width;
   determining a scaling factor using the longest dimension and the target die size; and
   scaling at least some of inputs using the scaling factors to generate two sets of inputs.

6. The method of claim 1, wherein selecting the one or more trained die models comprises:
   performing a table lookup using a trained die model lookup table and the scaled die thickness, two trained model die thicknesses, and an input heat transfer coefficient to retrieve a pair of scaled heat transfer coefficients for each of the two trained model die thicknesses.

7. The method of claim 6, wherein the trained die model lookup table relates a scaled die model thickness, scaled boundary conditions, and unscaled boundary conditions.

8. The method of claim 1, wherein the combination of decay curves is a weighted combination of a pair of decay curves.

9. The method of claim 8, further comprising:
   selecting the pair of decay curves using the relationship.

10. The method of claim 1, wherein the generating the die heat map comprises:
   applying a correction map to two raw heat maps to generate two corrected heat maps; and
   generating the die heat map by computing a weighted average of the two corrected heat maps.

11. The method of claim 10, wherein the die heat map includes a set of hot spots.

12. The method of claim 11, further comprising:
   refining the set of hot spots for the die heat map using singular vector decomposition machine learning.

13. A computer implemented method comprising:
   receiving a plurality of real die models representing a plurality of dies of different die sizes, each real die model respectively associated with a range of boundary conditions;
   scaling the plurality of real die models to generate a plurality of scaled die models sharing a common dimension of scaled die sizes of the scaled die models;
   simulating each scaled die model with a range of scaled boundary conditions to obtain a range of decay curves for the scaled die model, wherein the range of scaled boundary conditions for the scaled die model corresponds to a range of unscaled boundary conditions for a corresponding real die model of the scaled die model, and wherein the range of unscaled boundary conditions substantially includes a range of boundary conditions associated with the corresponding real die model; and
   generating a model to predict a decay curve for a die from a size and boundary conditions of the die based on the common dimension, the range of scaled boundary conditions and ranges of decay curves obtained for the plurality of scaled die models.

14. The method of claim 13, further comprising:

generating a correction map for each of the plurality of scaled die models.

15. The method of claim 13, wherein the common dimension corresponds to the longest of planar dimensions of the different die sizes.

16. A non-transitory machine-readable medium having executable instructions to cause one or more processing units to perform a method of generating a die heat map for a die, the method comprising:

receiving a die model for representing the die and a boundary condition applicable to the die, the die model including dimensions of the die;

scaling the dimensions of the die model and the boundary condition, wherein the dimensions of the die model is scaled to a target die size, the scaled dimensions including a scaled die thickness;

selecting one or more trained die models from a plurality of trained die models using the scaled die thickness, wherein each trained die model including a die surface of the target die size, different trained die models having different die thickness, the plurality of trained die models trained under a plurality of boundary conditions, each trained die model having a plurality of decay curves associated with the plurality of boundary conditions;

determining a relationship between the scaled boundary condition and the plurality of boundary conditions;

determining a decay curve for the die model according to a combination of decay curves associated with the plurality of boundary conditions for the one or more trained die models using the relationship; and generating the die heat map based on the decay curve determined for the die model.

17. The machine-readable medium of claim 16, wherein each decay curve represents a temperature change versus distance from a triggered source in a die represented by the die heat map.

18. The machine-readable medium of claim 16, wherein the die model further includes an ambient temperature.

19. The machine-readable medium of claim 16, wherein the selecting of the one or more trained die models:

selecting the one or more trained die models from a plurality of trained models where the one or more trained die models have a die thickness that is closet in value to the scaled die thickness.

20. That machine-readable medium of claim 16, wherein scaling dimensions of the die model to the target die size comprises:

determining a longest dimension from the dimensions of the die model, wherein the longest dimension is one of length and width;

determining a scaling factor using the longest dimension and the target die size; and scaling at least some of inputs using the scaling factors to generate two sets of inputs.

21. The machine-readable medium of claim 16, wherein the selecting the one or more trained die models comprises:

performing a table lookup using a trained die model lookup table and the scaled die thickness, two trained model die thicknesses, and an input heat transfer coefficient to retrieve a pair of scaled heat transfer coefficients for each of the two trained model die thicknesses.

22. The machine-readable medium of claim 21, wherein the trained die model lookup table relates a scaled die model thickness, scaled boundary conditions, and unscaled boundary conditions.

23. The machine-readable medium of claim 16, wherein the generating die heat map comprises:

applying a correction map to two raw heat maps to generate two corrected heat maps; and generating the die heat map by computing a weighted average of the two corrected heat maps.

24. A system comprising:

at least one processor;

a memory coupled to the processor though a bus; and a process executed from the memory by the at least one processor that causes the at least one processor to receive a die model for representing a die and a boundary condition applicable to the die, the die model including dimensions of the die, scale the dimensions of the die model and the boundary condition, wherein the dimensions of the die model is scaled to a target die size, the scaled dimensions including a scaled die thickness, select one or more trained die models from a plurality of trained die models using the scaled die thickness, wherein each trained die model including a die surface of the target die size, different trained die models having different die thickness, the plurality of trained die models trained under a plurality of boundary conditions, each trained die model having a plurality of decay curves associated with the plurality of boundary conditions, determine a relationship between the scaled boundary condition and the plurality of boundary conditions, determine a decay curve for the die model according to a combination of decay curves associated with the plurality of boundary conditions for the one or more trained die models using the relationship, and generate a die heat map based on the decay curve determined for the die model.

* * * * *